(12) United States Patent
Kim et al.

(10) Patent No.: US 12,345,861 B2
(45) Date of Patent: Jul. 1, 2025

(54) CAMERA MODULE AND PORTABLE TERMINAL

(71) Applicant: SAMSUNG ELECTRO-MECHANICS CO., LTD., Suwon-si (KR)

(72) Inventors: Byung Hyun Kim, Suwon-si (KR); So Mi Yang, Suwon-si (KR); Jae Hyuk Huh, Suwon-si (KR); Yong Joo Jo, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 0 days.

(21) Appl. No.: 18/485,627

(22) Filed: Oct. 12, 2023

(65) Prior Publication Data
US 2024/0045183 A1  Feb. 8, 2024

Related U.S. Application Data

(63) Continuation of application No. 17/177,338, filed on Feb. 17, 2021, now Pat. No. 11,822,060.

(30) Foreign Application Priority Data

Aug. 18, 2020 (KR) .................. 10-2020-0103310

(51) Int. Cl.
| | |
|---|---|
| *G02B 13/00* | (2006.01) |
| *G02B 1/118* | (2015.01) |
| *G02B 9/60* | (2006.01) |
| *G03B 17/17* | (2021.01) |

(52) U.S. Cl.
CPC .......... *G02B 13/0065* (2013.01); *G02B 1/118* (2013.01); *G02B 9/60* (2013.01); *G03B 17/17* (2013.01)

(58) Field of Classification Search
CPC ...... G02B 13/0065; G02B 1/118; G02B 9/60; G03B 17/17
(Continued)

(56) References Cited

U.S. PATENT DOCUMENTS

| | | | |
|---|---|---|---|
| 3,818,498 | A | 6/1974 | Zehnpfennig |
| 9,869,846 | B1 | 1/2018 | Bone et al. |

(Continued)

FOREIGN PATENT DOCUMENTS

| | | | |
|---|---|---|---|
| CN | 101034165 | A | 9/2007 |
| CN | 101233429 | A | 7/2008 |

(Continued)

OTHER PUBLICATIONS

Taiwanese Office Action issued on Jun. 6, 2022 in counterpart Taiwanese Patent Application No. 110106831 (4 pages in English, 5 pages in Mandarin).

(Continued)

*Primary Examiner* — William Choi
(74) *Attorney, Agent, or Firm* — NSIP Law

(57) ABSTRACT

A camera module includes a lens module including a plurality of lenses having refractive power, a first optical path folding unit disposed on the object side of the lens module and configured to refract or reflect incident light in an optical axis direction of the lens module. Among the lenses constituting the lens module, an effective radius of a lens closest to the first optical path folding unit may have substantially the same size as an effective radius of an exit surface of the first optical path folding unit.

17 Claims, 14 Drawing Sheets

(58) Field of Classification Search
    USPC .................................................. 359/726, 733
    See application file for complete search history.

(56) References Cited

U.S. PATENT DOCUMENTS

| | | | |
|---|---|---|---|
| 10,877,244 B1* | 12/2020 | Chen .................. | G02B 13/0015 |
| 2007/0211346 A1 | 9/2007 | Noguchi et al. | |
| 2009/0034067 A1 | 2/2009 | Katakura | |
| 2009/0257127 A1 | 10/2009 | Okayama et al. | |
| 2010/0214664 A1 | 8/2010 | Chia | |
| 2012/0075728 A1 | 3/2012 | Takakubo et al. | |
| 2015/0103417 A1 | 4/2015 | Nomura et al. | |
| 2017/0108623 A1 | 4/2017 | Nawata et al. | |
| 2018/0143403 A1 | 5/2018 | Tseng et al. | |
| 2018/0224633 A1 | 8/2018 | Wu et al. | |
| 2018/0246256 A1* | 8/2018 | Abe .................. | B29D 11/00884 |
| 2020/0088972 A1 | 3/2020 | Yoo et al. | |
| 2021/0318522 A1 | 10/2021 | Zhang et al. | |

FOREIGN PATENT DOCUMENTS

| | | |
|---|---|---|
| CN | 101359088 A | 2/2009 |
| CN | 102419470 A | 4/2012 |
| CN | 108107542 A | 6/2018 |
| CN | 109491055 A | 3/2019 |
| CN | 110908071 A | 3/2020 |
| CN | 111505799 A | 8/2020 |
| JP | 2003-329806 A | 11/2003 |
| JP | 2007-133096 A | 5/2007 |
| JP | 6207963 B2 | 10/2017 |
| KR | 10-2012-0021065 A | 3/2012 |
| KR | 10-2017-0030473 A | 3/2017 |
| KR | 10-2019-0088715 A | 7/2019 |
| TW | I406005 B1 | 8/2013 |
| TW | I613480 B | 2/2018 |
| WO | WO 2012/063711 A1 | 5/2012 |

OTHER PUBLICATIONS

Chinese Office Action issued on Dec. 7, 2022, in counterpart Chinese Patent Application No. 202210423905.4 (8 pages in English, 9 pages in Chinese).

Taiwanese Office Action issued on Nov. 6, 2024, in counterpart Taiwanese Patent Application No. 112115937 ( 4 pages in English, 5 pages in Chinese).

* cited by examiner

CAMERA MODULE AND PORTABLE TERMINAL

CROSS-REFERENCE TO RELATED APPLICATIONS

This application is a Continuation Application of U.S. patent application Ser. No. 17/177,338, filed on Feb. 17, 2021, which claims the benefit under 35 USC 119(a) of Korean Patent Application No. 10-2020-0103310 filed on Aug. 18, 2020 in the Korean Intellectual Property Office, the entire disclosure of which is incorporated herein by reference for all purposes.

BACKGROUND

1. Field

The following description relates to a camera module and a portable terminal, in which resolution degradation caused by a reflection phenomenon occurring from an incident surface or an exit surface of a light transmitting member may be significantly reduced.

2. Description of Related Art

Camera modules include light transmitting members. For example, a camera module includes a filter member for blocking ultraviolet rays. As another example, a camera module may include an optical path folding unit such as a prism or the like. Light-transmitting members such as filter members and prisms are configured to transmit light. The interface of a light-transmitting member in which light is incident or emitted is a part at which the refractive index of a medium changes, and thus, light reflection occurs. The reflection of light at the interface of the light transmitting member may lower the resolution of the camera module and cause a flare phenomenon.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

Examples provide a camera module and a portable terminal configured to reduce or suppress a reflection phenomenon of light generated from a light transmitting member.

In a general aspect, a camera module includes a lens module including a plurality of lenses having a refractive power, a first optical path folding unit disposed on the object side of the lens module and configured to refract or reflect incident light in an optical axis direction of the lens module. Among the lenses constituting the lens module, an effective radius of a lens closest to the first optical path folding unit may have substantially the same size as an effective radius of an exit surface of the first optical path folding unit.

The camera module may satisfy $1.0 < PRh/LES1 < 1.10$, where PRh is a maximum effective radius of an exit surface of the first optical path folding unit and LES1 is a maximum effective radius of a lens closest to the object side in the lens module The first optical path folding unit may include an antireflection layer disposed thereon.

The antireflection layer may be disposed on one or both of an incident surface of the first optical path folding unit and the exit surface of the first optical path folding unit.

The antireflection layer may include a plurality of protrusions.

The antireflection layer may include a first antireflection layer disposed on an incident surface of the first optical path folding unit and including a first protrusion; and a second antireflection forming layer disposed on the exit surface of the first optical path folding unit and including a second protrusion.

The first protrusion and the second protrusion may have different sizes.

A formation gap of the first protrusion may be different from a formation gap of the second protrusion.

At least one or more of lenses constituting the lens module may be configured to have different sizes in a first direction and a second direction intersecting an optical axis.

The lens module may include a first lens, a second lens, a third lens, a fourth lens, and a fifth lens sequentially disposed from the object side of the lens module.

The first lens, the third lens and the fifth lens may have a positive refractive power, and the second lens and the fourth lens may have a negative refractive power.

At least four of the first lens, the second lens, the third lens, the fourth lens, and the fifth lens may have a convex object-side surface.

At least three of the first lens, the second lens, the third lens, the fourth lens, and fifth lens may have a concave image-side surface.

The camera module may include a second optical path folding unit disposed between the lens module and an image plane.

A second antireflection layer may include a protrusion and may be disposed on one or both of an incident surface of the second optical path folding unit and an exit surface of the second optical path folding unit.

A portable terminal may include the camera module.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

Figure 1:
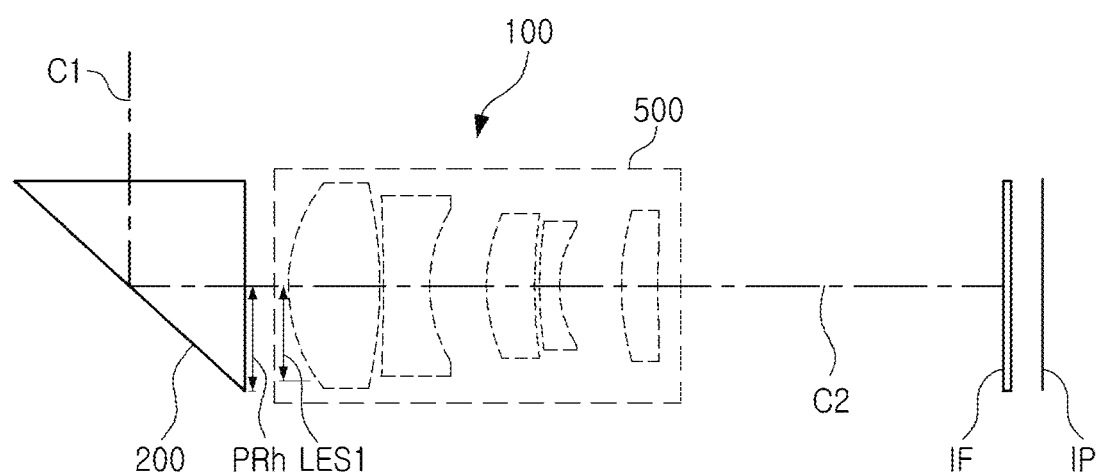
FIG. 1 is a configuration diagram of a camera module according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed, as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is to be noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various ways as will be apparent after gaining an understanding of the disclosure of this application. Further, although the examples described herein have a variety of configurations, other configurations are possible as will be apparent after gaining an understanding of the disclosure of this application.

The drawings may not be to scale, and the relative sizes, proportions, and depictions of elements in the drawings may be exaggerated for clarity, illustration, and convenience.

An optical imaging system includes a plurality of lenses disposed along an optical axis. The plurality of lenses may be spaced apart from each other by predetermined distances along the optical axis.

For example, the optical imaging system includes a first lens, a second lens, a third lens, a fourth lens, and a fifth sequentially disposed in ascending numerical order along the optical axis from an object side of the optical imaging system toward an imaging plane of the optical imaging system, with the first lens being closest to the object side of the optical imaging system and the fifth lens being closest to the imaging plane.

In each lens, an object-side surface or a first surface is a surface of the lens closest to the object side of the optical imaging system, and an image-side surface or a second surface is a surface of the lens closest to the imaging plane.

Unless stated otherwise, a reference to a shape of a lens surface refers to a shape of a paraxial region of the lens surface. A paraxial region of a lens surface is a central portion of the lens surface surrounding and including the optical axis of the lens surface in which light rays incident to the lens surface make a small angle θ to the optical axis, and the approximations sin θ≈θ, tan θ≈θ, and cos θ≈1 are valid.

For example, a statement that an object-side surface of a lens is convex means that at least a paraxial region of the object-side surface of the lens is convex, and a statement that an image-side surface of the lens is concave means that at least a paraxial region of the image-side surface of the lens is concave. Therefore, even though the object-side surface of the lens may be described as being convex, the entire object-side surface of the lens may not be convex, and a peripheral region of the object-side surface of the lens may be concave. Also, even though the image-side surface of the lens may be described as being concave, the entire image-side surface of the lens may not be concave, and a peripheral region of the image-side surface of the lens may be convex.

At least one of the first to fifth lenses of the optical imaging system may have at least one aspherical surface.

For example, either one or both of the object-side surface and the image-side surface of at least one of the first to fifth lenses may be aspherical. Each aspherical surface is defined by Equation 1 below.

$$Z = \frac{cY^2}{1 + \sqrt{1-(1+K)c^2Y^2}} + AY^4 + BY^6 + CY^8 + DY^{10} + EY^{12} + FY^{14} + GY^{16} + HY^{18} \quad (1)$$

In Equation 1, c is a curvature of a lens surface and is equal to a reciprocal of a radius of curvature of the lens surface at an optical axis of the lens surface, K is a conic constant, Y is a distance from any point on the lens surface to the optical axis of the lens surface in a direction perpendicular to the optical axis of the lens surface, A to H are aspheric constants, and Z (also known as sag) is a distance in a direction parallel to the optical axis of the lens surface from the point on the lens surface at the distance Y from the optical axis of the lens surface to a tangential plane perpendicular to the optical axis and intersecting a vertex of the lens surface.

The optical imaging system may further include other elements in addition to the first to fifth lenses.

The optical imaging system may further include at least one stop disposed before the first lens, or between any two adjacent lenses of the first to fifth lenses, or between the fifth lens and the imaging plane. The optical imaging system may include two or more stops disposed at different locations.

The optical imaging system may further include an image sensor having an imaging surface disposed at the imaging plane of the optical imaging system. The image sensor converts an image of an object formed on an effective imaging area of the imaging surface by the lenses of the optical imaging system into an electrical signal The optical imaging system may further include an infrared blocking filter, hereinafter referred to as a filter, for blocking infrared light. The filter may be disposed between the fifth lens and the imaging plane.

The optical imaging system may further include at least one reflective member having a reflective surface that changes a direction of an optical path in the optical imaging system. For example, the reflective member may be a prism or a mirror.

For example, the reflective member may be disposed in the optical path on the object-side of the first lens, between any two lenses among the second to fifth lenses, or on the image-side of the fifth lens.

For example, the optical imaging system may further include a first reflective member disposed in an optical path between the object side of the optical imaging system and the object-side surface of the first lens. Therefore, the first lens may be a lens disposed closest to the first reflective member among the first to fifth lenses.

Also, the optical imaging system may further include a second reflective member disposed in an optical path between the image-side surface of the fifth lens and the imaging plane. Therefore, the fifth lens may be a lens disposed closest to the second reflective member among the first to fifth lenses.

TTL is a distance along the optical axis from the object-side surface of the first lens to the imaging plane.

SL is a distance along the optical axis from a stop of the optical imaging system to the imaging plane.

BFL is a distance along the optical axis from the image-side surface of the lens to the imaging plane.

PTTL is a distance along the optical axis from the reflective surface of the first reflective member to the imaging plane.

ImgH is a maximum effective image height of the optical imaging system and is equal to one half of a diagonal length of the effective imaging area of the imaging surface of the image sensor.

f is a focal length of the optical imaging system, and f1, f2, f3, f4, and f5 are respective focal lengths of the first to fifth lenses.

FOV is an angle of view of the optical imaging system.

Fno is an f-number of the optical imaging system, and is equal to the focal length f of the optical imaging system divided by an entrance pupil diameter of the optical imaging system.

An effective aperture radius of a lens surface is a radius of a portion of the lens surface through which light actually passes, and is not necessarily a radius of an outer edge of the lens surface. Stated another way, an effective aperture radius of a lens surface is a distance in a direction perpendicular to an optical axis of the lens surface between the optical axis and a marginal ray of light passing through the lens surface. The object-side surface of a lens and the image-side surface of the lens may have different effective aperture radiuses.

Radiuses of curvature of the surfaces of the lenses, thickness of the lenses and the other elements, distances between adjacent ones of the lenses and the other elements, focal lengths of the lenses, the focal length f of the optical imaging system, the respective focal lengths f1, f2, f3, f4, and f5 of the first to fifth lenses, TTL, SL, BFL, PTTL, and ImgH are expressed in millimeters (mm), although other units of measurement may be used. FOV is expressed in degrees. Fno, refractive indexes of the lenses, and Abbe numbers of the lenses are dimensionless quantities.

The thicknesses of the lenses and the other elements, the distances between the adjacent ones of the lenses and the other elements, TTL, SL, BFL, and PTTL are measured along the optical axis of the optical imaging system.

A camera module according to an example will be described with reference to FIG. 1.

A camera module 100 may include a first optical path folding unit 200 and a lens module 500.

The first optical path folding unit 200 may be disposed foremost in the camera module 100. The first optical path folding unit 200 may be disposed on the object side of the lens module 500. The first optical path folding unit 200 may be configured to refract or reflect light incident through an opening of the camera module 100 in the optical axis direction of the lens module 500. For example, the first optical path folding unit 200 may refract or reflect light incident along a first optical axis C1 in the direction of a second optical axis C2. The first optical axis C1 and the second optical axis C2 may intersect each other. The first optical path folding unit 200 may be in the form of a prism or a reflector. However, the shape of the first optical path folding unit 200 is not limited to a prism and a reflector.

The lens module 500 may include one or more lenses. For example, the lens module 500 may include two or more lenses. However, the number of lenses constituting the lens module 500 is not limited to two. For example, the lens module 500 may be comprised of 5 lenses as illustrated in FIG. 1.

The lens module 500 may form a predetermined size relationship with the first optical path folding unit 200. For example, a maximum effective radius LES1 of the lens closest to the object side in the lens module 500 may be substantially the same size as a maximum effective radius PRh of an exit surface of the first optical path folding unit 200. In detail, PRh/LES1 may be greater than 1.0 and less than 1.10.

The camera module 100 may further include a filter IF and an image sensor IP. The filter IF and the image sensor IP may be disposed behind the lens module 500. The filter IF may be configured to block a specific wavelength from light incident on the image sensor IP. For example, the filter IF may be configured to block light having an infrared wavelength. The image sensor IP may be configured to convert an incident optical signal into an electric signal. For example, the image sensor IP may have a CMOS type.

The camera module 100 according to an example may be configured to suppress a flare phenomenon. For example, the camera module 100 may include an antireflection layer 300.

Figure 2A:
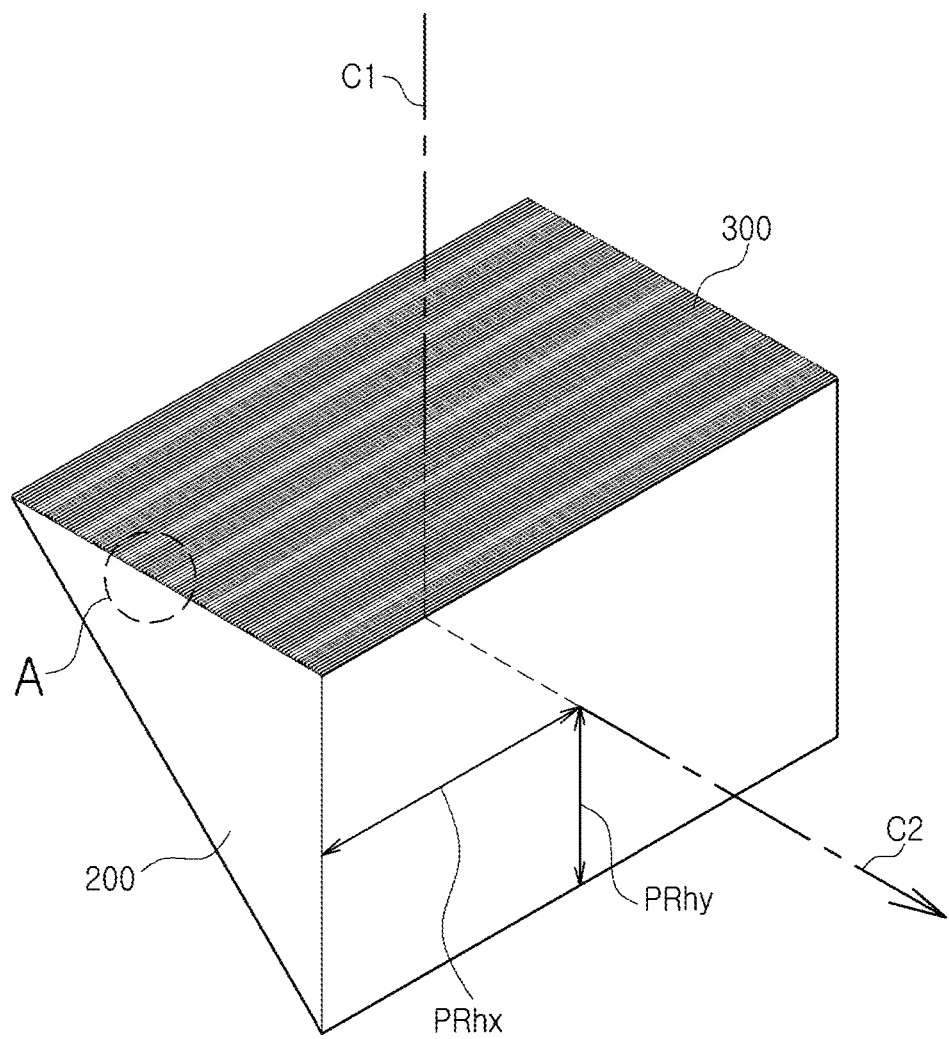
FIGS. 2A and 2B are enlarged views of a first optical path folding unit according to an example.
Figure 2B:
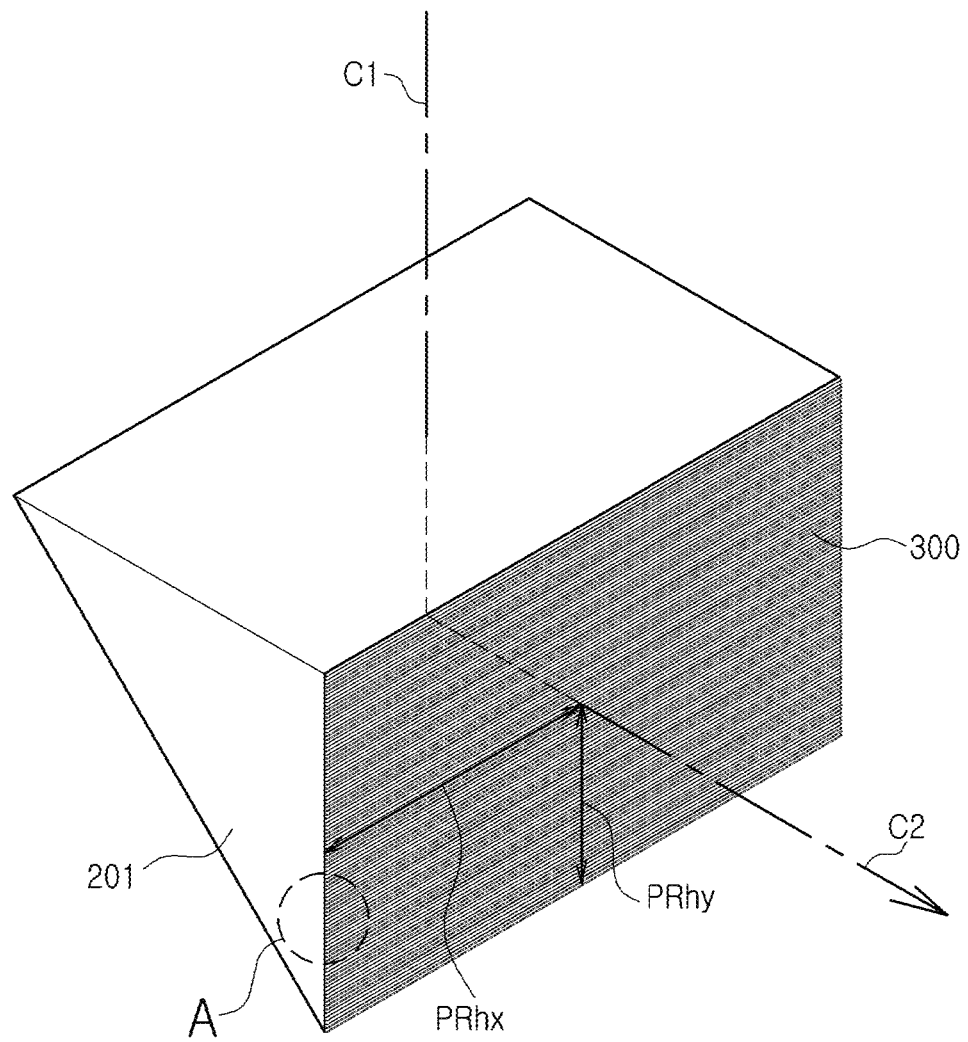

The antireflection layer 300 may be configured to reduce a flare phenomenon caused by reflection of light incident on the camera module 100. The antireflection layer 300 may be formed on the first optical path folding unit 200 as illustrated in FIGS. 2A and 2B. For example, the antireflection layer 300 may be formed on the incident surface of the first optical path folding unit 200 (FIG. 2A) or on the exit surface of the first optical path folding unit 201 (FIG. 2B). The antireflection layer 300 may reduce the size of the first optical path folding unit 200. For example, by using the antireflection layer 300, the size (PRhx*2) of the first optical path folding unit 200 in the width direction or the size (PRhy*2) thereof in the height direction, or the size (PRhx*2) of the first optical path folding unit 200 in the width direction and the size (PRhy*2) thereof in the height direction may be reduced. Accordingly, the camera module 100 according to an example is advantageous for miniaturization and thinning, and thus may be mounted on an ultra-thin portable terminal.

Figure 3:
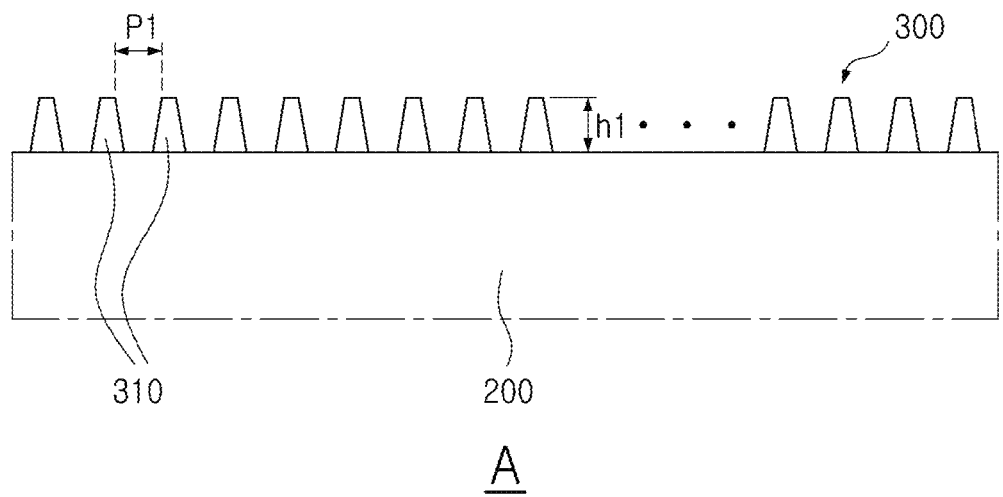
FIG. 3 is an enlarged view of portion A illustrated in FIGS. 2A and 2B.

The antireflection layer 300 may include a plurality of protrusions 310 formed at a first height h1 as illustrated in FIG. 3. The protrusions 310 may be disposed along the incident surface or exit surface of the first optical path folding unit 200 at a first gap P1 between the protrusions 310. The first height h1 and the first gap P1 of the protrusion 310 may vary depending on the type of the camera module 100 or the formation position of the antireflection layer 300. For example, the first height h1 or the first gap P1 of the protrusion 310 formed on the incident surface of the first optical path folding unit 200 may be different from the first height h1 or the first gap P1 of the protrusion 310 formed on the exit surface of the first optical path folding unit 200. However, the protrusions 310 formed on the incident surface of the first optical path folding unit 200 and the protrusions 310 formed on the exit surface thereof are not necessarily formed at different heights or at different gaps.

Figure 4:
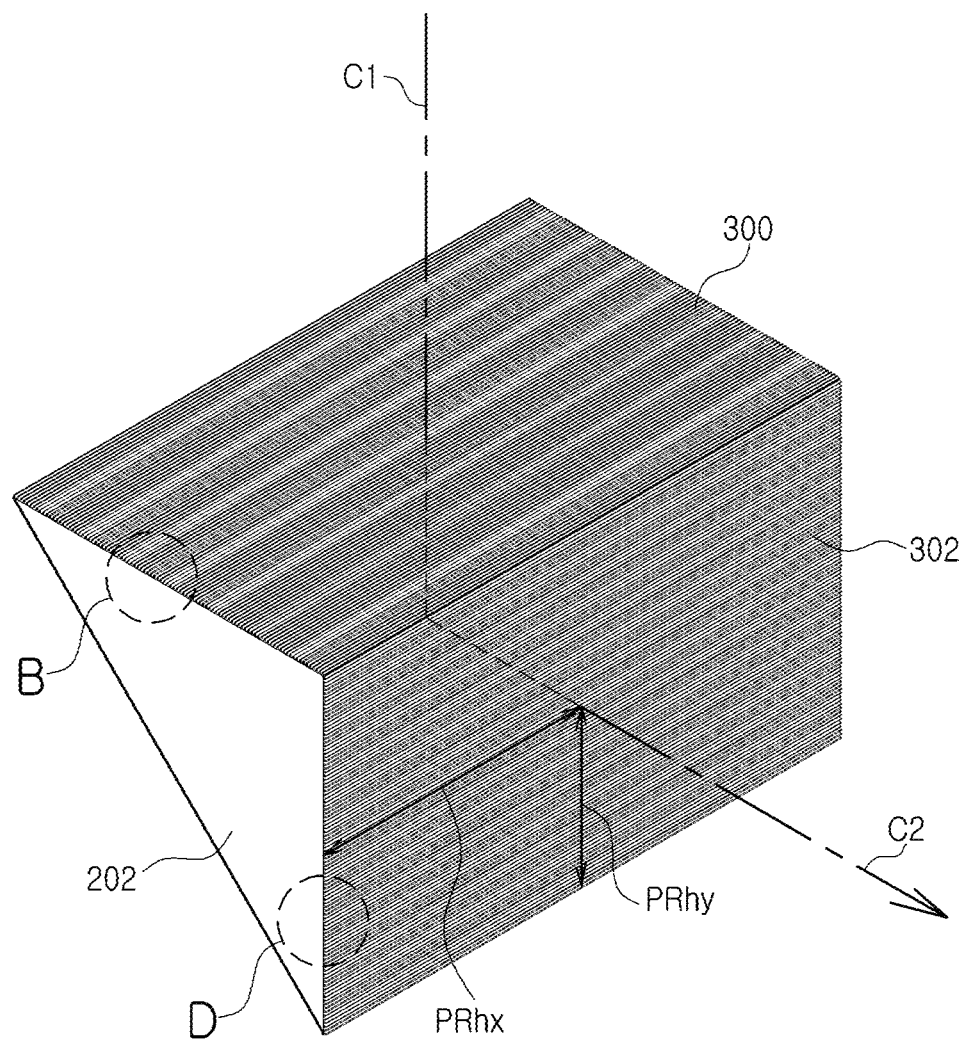
FIG. 4 is an enlarged view of a first optical path folding unit according to another form.
Figure 5A:
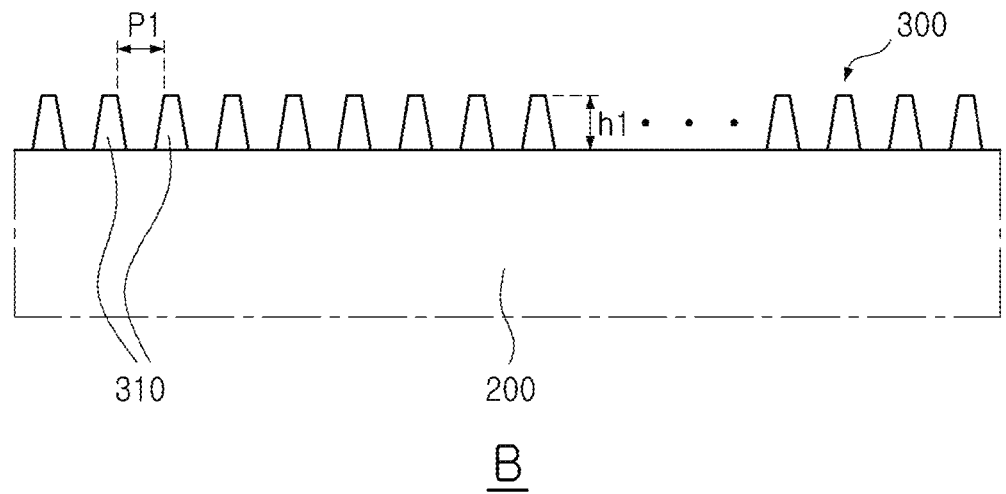
FIGS. 5A and 5B are enlarged views of portions B and D illustrated in FIG. 4.
Figure 5B:
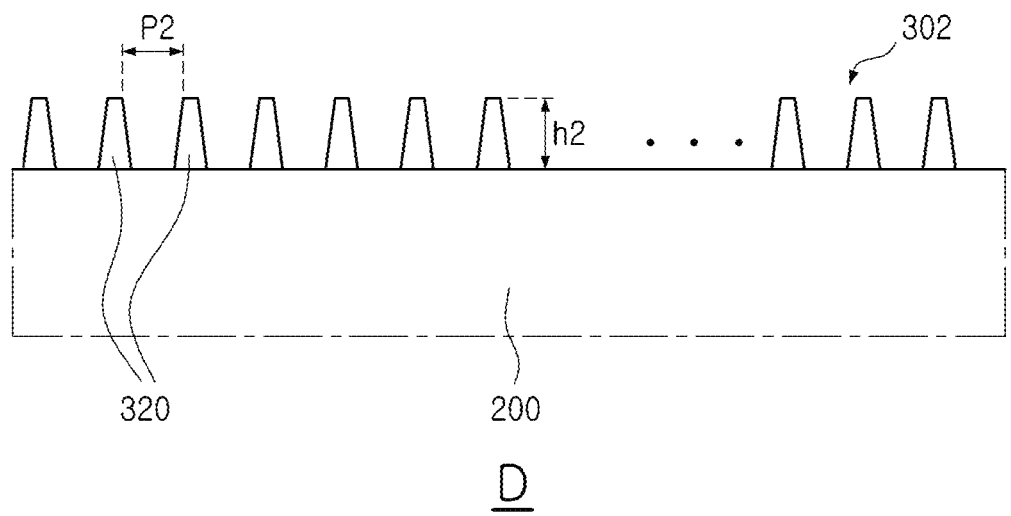

According to another example, as illustrated in FIGS. 4, 5A, and 5B, antireflection layers 300 and 302 may be formed on both the incident surface and the exit surface of the first optical path folding unit 202. The first antireflection layer 300 formed on the incidence surface of the first optical path folding unit 202 may be configured differently from the second antireflection layer 302 formed on the exit surface of the first optical path folding unit 202. For example, the first height h1 of the first protrusion 310 constituting the first antireflection layer 300 and the first gap P1 between the first protrusions 310 may be different from the second height h2 of the second protrusion 320 and the second gap P2 between the second protrusions 320. For example, the first height h1 of the first protrusion 310 may be less than the second height h2 of the second protrusion 320. As another example, the first gap P1 between the first protrusions 310 may be less than the second gap P2 between the second protrusions 320. However, the large-small relationship between the first protrusion 310 of the first antireflection layer 300 and the second protrusion 320 of the second antireflection layer 302 is not limited to the above-described form. For example, the first height h1 of the first protrusion 310 may be greater than the second height h2 of the second protrusion 320. As another example, the first gap P1 between the first protrusions 310 may be greater than the second gap P2 between the second protrusions 320.

The first optical path folding unit 202 according to this form has the antireflection layers 300 and 302 formed on both the incident surface and the exit surface, and thus, the reflection of light that may be caused on the incident surface and the exit surface and a flare phenomenon caused by the reflection of light may be blocked or alleviated.

Figure 6A:
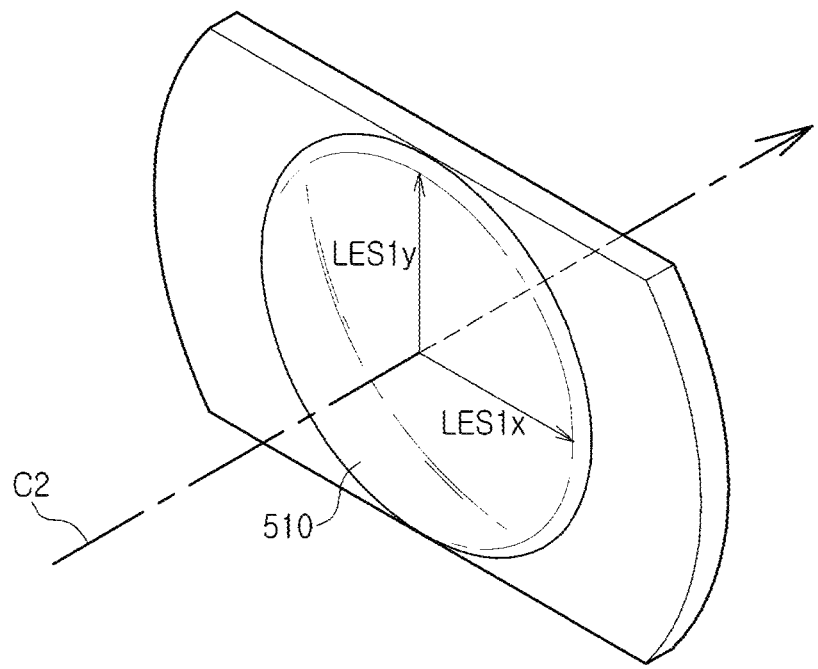
FIGS. 6A and 6B are enlarged perspective views of lenses constituting a lens module.

Next, a foremost lens (a lens closest to the object side) of the lens module 500 will be described with reference to FIGS. 6A and 6B.

The lens module 500 may include a plurality of lenses. One of the plurality of lenses may be formed larger than the other lenses. For example, in the lens module 500, effective radiuses LES1x and LES1y of the foremost lens 510 may be greater than the effective radiuses of other lenses. Effective diameters (2*LES1x, 2*LES1y) of the foremost lens 510 may have substantially the same size as the width or height of the exit surface of the first optical path folding unit 300. As an example, the effective diameter (2*LES1x) of the foremost lens 510 in the first direction may have a size substantially equal to or smaller than the width (2*PRhx) of the exit surface of the first optical path folding unit 300. As another example, the effective diameter (2*LES1y) of the foremost lens 510 in the second direction may have a size substantially equal to or smaller than the height (2*PRhy) of the exit surface of the first optical path folding unit 300. The foremost lens 510 may be formed to have different sizes in a first direction intersecting the second optical axis C2 and in a second direction intersecting the second optical axis C2. For example, when viewed from the second optical axis (C2) direction, the foremost lens 510 may have a substantially rectangular shape.

Figure 6B:
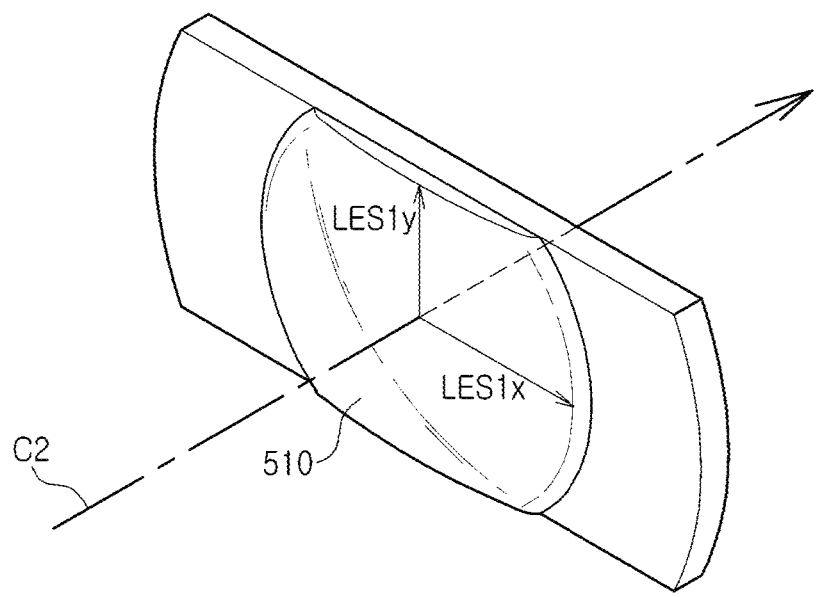

The foremost lens 510 may be configured in the form illustrated in FIG. 6B to enable the camera module 100 to be thinner. For example, the effective radius LES1y of the foremost lens 510 in the second direction may be less than the effective radius LES1x of the foremost lens 510 in the first direction.

The camera module 100 including the first optical path folding unit 200 (or 201 or 202), the lens module 500, and the antireflection layers 300 and/or 302 of the above-described form may substantially reduce the reflection by incident light and a flare phenomenon due to reflection of light, and thus, high-resolution photos and video may be obtained.

Next, the configuration of the lens module constituting the camera module will be described in detail.

The camera module according to an example may include a lens module that satisfies one or more of the following conditional expressions.

$$10 \text{ mm} \leq f$$

$$1.0 < PRh/LES1 < 1.1$$

$$3.2 < n2 + n3$$

$$|f1 + f2| < 2.0$$

$$0 \leq DL1L2/f$$

$$0.8 < EL1S1/\text{Img}HT < 1.5$$

$$0.8 \leq EL1S2/EL1S1 \leq 1.0$$

$$0.8 \leq TTL/f \leq 0.95$$

$$3.5 \leq TTL/\text{Img}HT$$

$$0.2 < R1/f \leq 0.6$$

$$2.6 < f\text{-number}$$

$$|f/f1 + f/f2| < 1.2$$

$$4.0 < f/(f\text{-number})$$

In the above conditional expressions, f is the focal length of the optical system, PRh is a maximum effective radius of the optical path folding unit, LES1 is a maximum effective radius of the lens constituting the lens module, n2 is the refractive index of the second lens, n3 is the refractive index of the third lens, f1 is the focal length of the first lens, f2 is the focal length of the second lens, DL1L2 is the distance from the image-side surface of the first lens to the object-side surface of the second lens, EL1S1 is the effective radius of the object-side surface of the first lens, EL1S2 is the effective radius of the image-side surface of the first lens, TTL is the distance from the object-side surface of the first lens to the image plane, ImgHT is the height of the image plane (one-half of a diagonal length of the image plane), and R1 is the radius of curvature of the object-side surface of the first lens.

Next, a detailed example of the camera module will be described.

Figure 7:
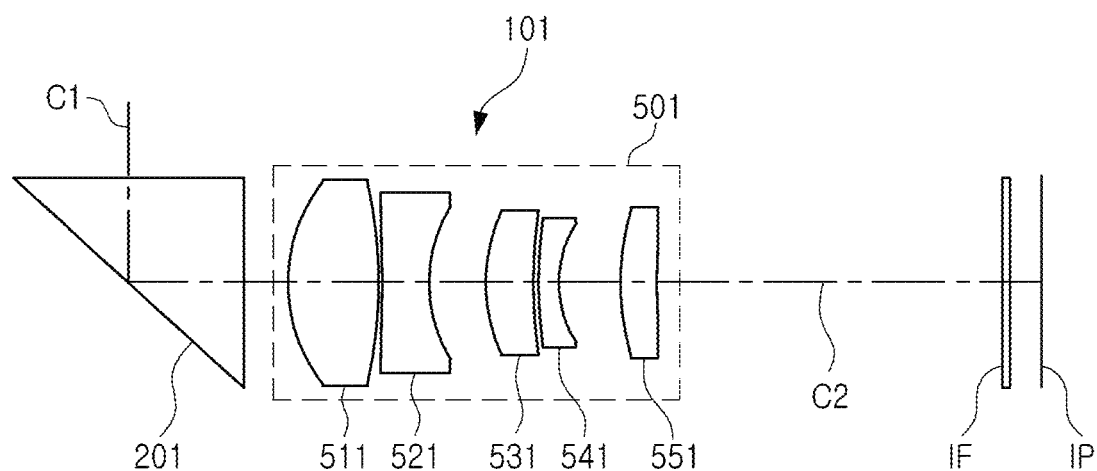
FIG. 7 is a configuration diagram of a camera module including a lens module according to an example.

First, a camera module according to a first example will be described with reference to FIG. 7.

A camera module 101 may include a first optical path folding unit 201, a lens module 501, a filter IF, and an image sensor IP.

The first optical path folding unit 201 may be configured to refract or reflect a path of incident light incident along a first optical axis C1 in the direction of a second optical axis C2. For example, the first optical path folding unit 201 may be a prism. As described above, an antireflection layer may be formed on the incident surface or the exit surface or the incident surface and the exit surface of the first optical path folding unit 201.

The filter IF is disposed in front of the image sensor IP, and may block infrared rays or the like included in the incident light. The image sensor IP may be comprised of a plurality of optical sensors. The image sensor IP may be configured to convert an optical signal into an electrical signal. The image sensor IP may form an image plane on which light incident through the lens module 501 is imaged.

The lens module 501 includes a first lens 511, a second lens 521, a third lens 531, a fourth lens 541, and a fifth lens 551 sequentially disposed from the object side.

The first lens 511 has positive refractive power. The fifth lens 521 has a convex object-side surface and a convex image-side surface. The second lens 521 has negative refractive power. The second lens 521 has a convex object-side surface and a concave image-side surface. The third lens 531 has positive refractive power. The third lens 531 has a convex object-side surface and a concave image-side surface. The fourth lens 541 has negative refractive power. The fourth lens 541 has a convex object-side surface and a concave image-side surface. The fifth lens 551 has positive refractive power. The fifth lens 551 has a convex object-side surface and a concave image-side surface.

Figure 8:
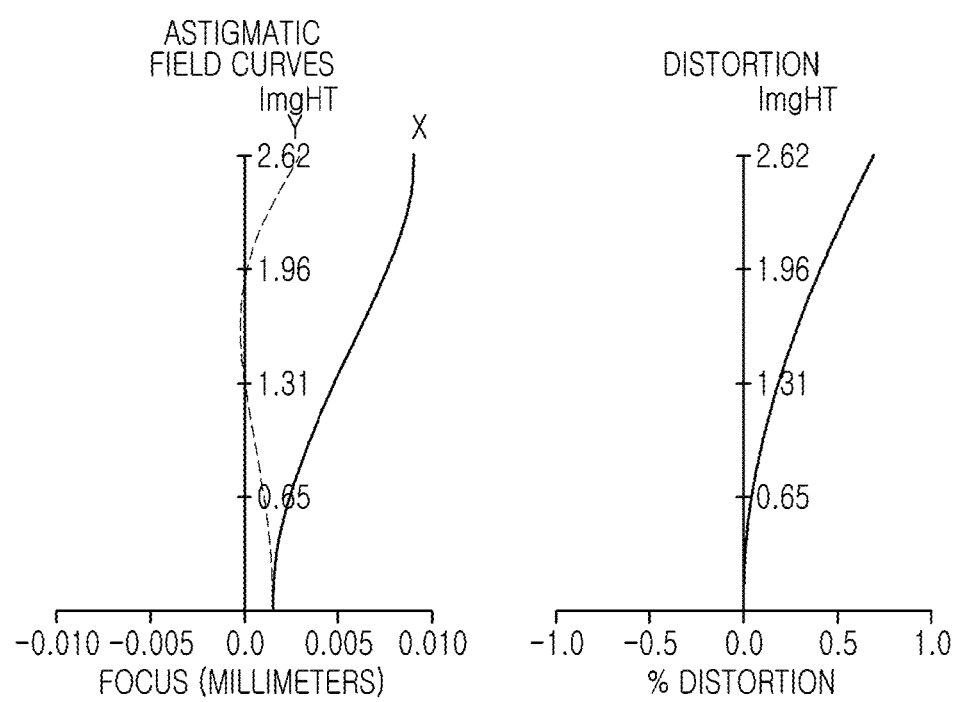
FIG. 8 is an aberration diagram of the lens module illustrated in FIG. 7.

Table 1 illustrates the lens characteristics of the lens module 501, and Table 2 provides the aspherical surface values of the lens module 501. FIG. 8 is an aberration curve of the lens module 501 configured as above.

TABLE 1

| Surface Number | Remark | Curvature Radius | Thickness/ Distance | Refractive Index | Abbe Number | Effective Radius |
|---|---|---|---|---|---|---|
| S1 | Prism | Infinity | 0.000 | | | 2.625 |
| S2 | | Infinity | 2.525 | 1.723 | 29.5 | 2.525 |
| S3 | | Infinity | 2.525 | 1.723 | 29.5 | 3.571 |
| S4 | | Infinity | 1.000 | | | 2.525 |
| S5 | First Lens | 4.54 | 1.968 | 1.537 | 55.7 | 2.500 |
| S6 | | −11.60 | 0.058 | | | 2.300 |
| S7 | Second Lens | 321.87 | 1.030 | 1.621 | 26.0 | 2.193 |
| S8 | | 3.51 | 1.252 | | | 1.834 |
| S9 | Third Lens | 4.11 | 1.074 | 1.679 | 19.2 | 1.742 |
| S10 | | 12.66 | 0.100 | | | 1.596 |
| S11 | Fourth Lens | 10.14 | 0.447 | 1.621 | 26.0 | 1.563 |
| S12 | | 2.75 | 1.342 | | | 1.422 |
| S13 | Fifth Lens | 6.25 | 0.804 | 1.547 | 56.1 | 1.816 |
| S14 | | 27.56 | 7.567 | | | 1.816 |
| S15 | Filter | Infinity | 0.188 | 1.519 | 64.2 | 2.525 |
| S16 | | Infinity | 0.680 | | | 2.540 |
| S17 | Image Plane | Infinity | 0.002 | | | 2.620 |

TABLE 2

| Surface Number | S5 | S6 | S7 | S8 | S9 | S10 | S11 | S12 | S13 | S14 |
|---|---|---|---|---|---|---|---|---|---|---|
| K | −0.68631 | −2.34166 | −99.00000 | 0.07210 | 0.06836 | −4.00987 | 3.54991 | −0.09767 | −0.62797 | −21.94380 |
| A | −0.00037 | −0.00105 | 0.00204 | 0.00454 | 0.00383 | 0.00422 | 0.00366 | 0.00836 | 0.00742 | 0.00535 |
| B | 0.00001 | 0.00003 | −0.00021 | −0.00005 | −0.00034 | −0.00053 | 0.00009 | −0.00058 | −0.00030 | 0.00017 |
| C | 0.00000 | 0.00000 | 0.00000 | 0.00002 | 0.00001 | 0.00005 | −0.00008 | −0.00022 | −0.00013 | −0.00005 |
| D | 0.00000 | 0.00000 | 0.00000 | 0.00000 | 0.00000 | 0.00000 | 0.00002 | −0.00004 | −0.00002 | −0.00003 |
| E | 0.00000 | 0.00000 | 0.00000 | 0.00000 | 0.00000 | 0.00000 | 0.00000 | 0.00003 | 0.00000 | 0.00000 |
| F | 0.00000 | 0.00000 | 0.00000 | 0.00000 | 0.00000 | 0.00000 | 0.00000 | 0.00000 | 0.00000 | 0.00000 |
| G | 0.00000 | 0.00000 | 0.00000 | 0.00000 | 0.00000 | 0.00000 | 0.00000 | 0.00000 | 0.00000 | 0.00000 |
| H | 0.00000 | 0.00000 | 0.00000 | 0.00000 | 0.00000 | 0.00000 | 0.00000 | 0.00000 | 0.00000 | 0.00000 |
| J | 0.00000 | 0.00000 | 0.00000 | 0.00000 | 0.00000 | 0.00000 | 0.00000 | 0.00000 | 0.00000 | 0.00000 |

Figure 9:
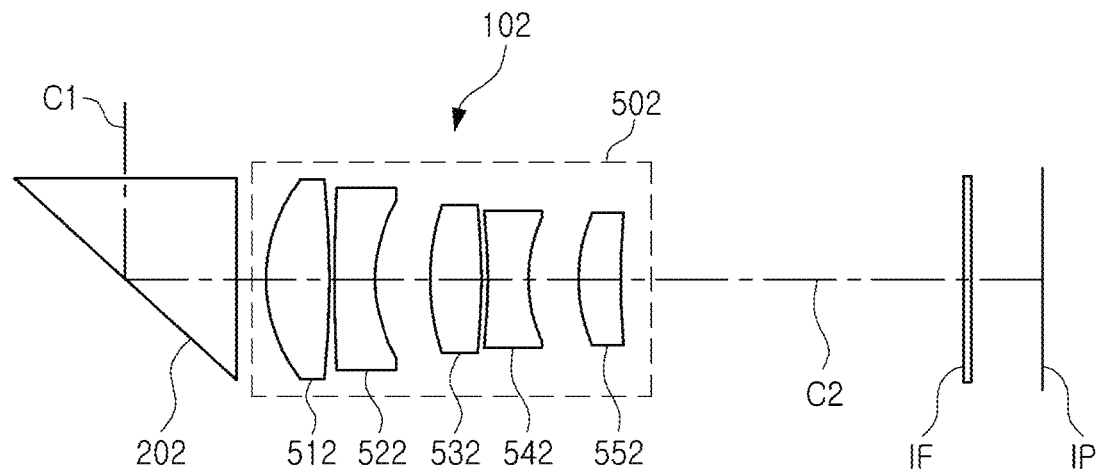
FIG. 9 is a configuration diagram of a camera module including a lens module according to another example.

A camera module according to a second example will be described with reference to FIG. 9.

A camera module 102 may include a first optical path folding unit 202, a lens module 502, a filter IF, and an image sensor IP.

The first optical path folding unit 202 may be configured to refract or reflect a path of incident light incident along a first optical axis C1 in the direction of a second optical axis C2. For example, the first optical path folding unit 202 may be a prism. As described above, an antireflection layer may be formed on the incident surface or the exit surface or on the incident surface and the exit surface of the first optical path folding unit 202.

The filter IF is disposed in front of the image sensor IP, and may block infrared rays or the like included in the incident light. The image sensor IP may be comprised of a plurality of optical sensors. The image sensor IP may be configured to convert an optical signal into an electrical signal. The image sensor IP may form an image plane on which light incident through the lens module 502 is imaged.

The lens module 502 includes a first lens 512, a second lens 522, a third lens 532, a fourth lens 542, and a fifth lens 552.

The first lens 512 has positive refractive power. The fifth lens 512 has a convex object-side surface and a convex image-side surface. The second lens 522 has negative refractive power. The second lens 522 has a convex object-side surface and a concave image-side surface. The third lens 532 has positive refractive power. The third lens 532 has a convex object-side surface and a convex image-side surface. The fourth lens 542 has negative refractive power. The fourth lens 542 has a concave object-side surface and a concave image-side surface. The fifth lens 552 has positive refractive power. The fifth lens 552 has a convex object-side surface and a concave image-side surface.

Figure 10:
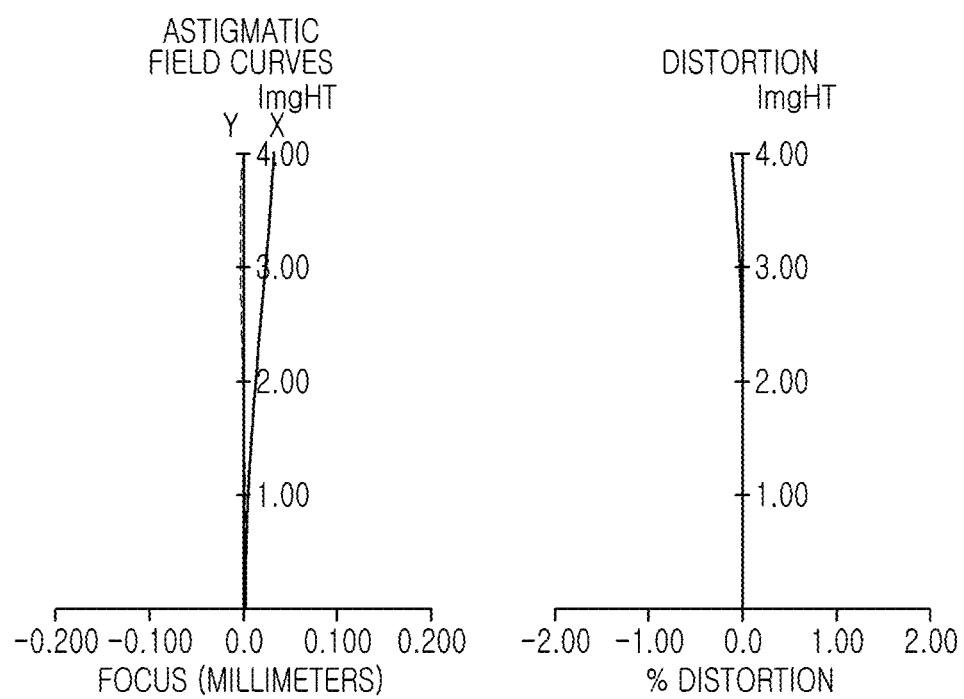
FIG. 10 is an aberration diagram of the lens module illustrated in FIG. 9.

Table 3 shows the lens characteristics of the lens module 502, and Table 4 shows the aspherical surface values of the lens module 502. FIG. 10 illustrates an aberration curve of the lens module 502 configured as above.

TABLE 3

| Surface Number | Remark | Curvature Radius | Thickness/ Distance | Refractive Index | Abbe Number | Effective Radius |
|---|---|---|---|---|---|---|
| S1 | Prism | Infinity | 0.000 | | | 3.805 |
| S2 | | Infinity | 3.596 | 1.723 | 29.5 | 3.596 |
| S3 | | Infinity | 3.596 | 1.723 | 29.5 | 5.085 |
| S4 | | Infinity | 1.000 | | | 3.596 |
| S5 | First Lens | 6.05 | 1.996 | 1.537 | 55.7 | 3.560 |
| S6 | | −44.44 | 0.211 | | | 3.397 |
| S7 | Second Lens | 48.21 | 1.290 | 1.621 | 26.0 | 3.248 |
| S8 | | 5.18 | 1.830 | | | 2.789 |
| S9 | Third Lens | 8.84 | 1.647 | 1.679 | 19.2 | 2.655 |
| S10 | | −47.84 | 0.200 | | | 2.513 |
| S11 | Fourth Lens | −48.90 | 1.310 | 1.621 | 26.0 | 2.450 |
| S12 | | 5.00 | 1.660 | | | 2.220 |
| S13 | Fifth Lens | 6.56 | 1.352 | 1.547 | 56.1 | 2.300 |
| S14 | | 26.53 | 11.128 | | | 2.363 |
| S15 | Filter | Infinity | 0.210 | 1.519 | 64.2 | 3.680 |
| S16 | | Infinity | 2.338 | | | 3.697 |
| S17 | Image Plane | Infinity | 0.002 | | | 4.001 |

TABLE 4

| Surface Number | S5 | S6 | S7 | S8 | S9 | S10 | S11 | S12 | S13 | S14 |
|---|---|---|---|---|---|---|---|---|---|---|
| K | −0.63329 | 6.46596 | 69.13552 | 0.02568 | 0.24790 | 23.65017 | 89.39002 | −0.15819 | −0.69908 | −7.63334 |
| A | −0.00015 | −0.00031 | 0.00063 | 0.00149 | 0.00115 | 0.00137 | 0.00108 | 0.00278 | 0.00244 | 0.00128 |
| B | 0.00000 | 0.00000 | −0.00003 | 0.00000 | −0.00005 | −0.00008 | 0.00001 | −0.00009 | −0.00003 | 0.00003 |
| C | 0.00000 | 0.00000 | 0.00000 | 0.00000 | 0.00000 | 0.00000 | −0.00001 | −0.00001 | −0.00001 | 0.00000 |
| D | 0.00000 | 0.00000 | 0.00000 | 0.00000 | 0.00000 | 0.00000 | 0.00000 | 0.00000 | 0.00000 | 0.00000 |
| E | 0.00000 | 0.00000 | 0.00000 | 0.00000 | 0.00000 | 0.00000 | 0.00000 | 0.00000 | 0.00000 | 0.00000 |
| F | 0.00000 | 0.00000 | 0.00000 | 0.00000 | 0.00000 | 0.00000 | 0.00000 | 0.00000 | 0.00000 | 0.00000 |
| G | 0.00000 | 0.00000 | 0.00000 | 0.00000 | 0.00000 | 0.00000 | 0.00000 | 0.00000 | 0.00000 | 0.00000 |
| H | 0.00000 | 0.00000 | 0.00000 | 0.00000 | 0.00000 | 0.00000 | 0.00000 | 0.00000 | 0.00000 | 0.00000 |
| J | 0.00000 | 0.00000 | 0.00000 | 0.00000 | 0.00000 | 0.00000 | 0.00000 | 0.00000 | 0.00000 | 0.00000 |

Figure 11:
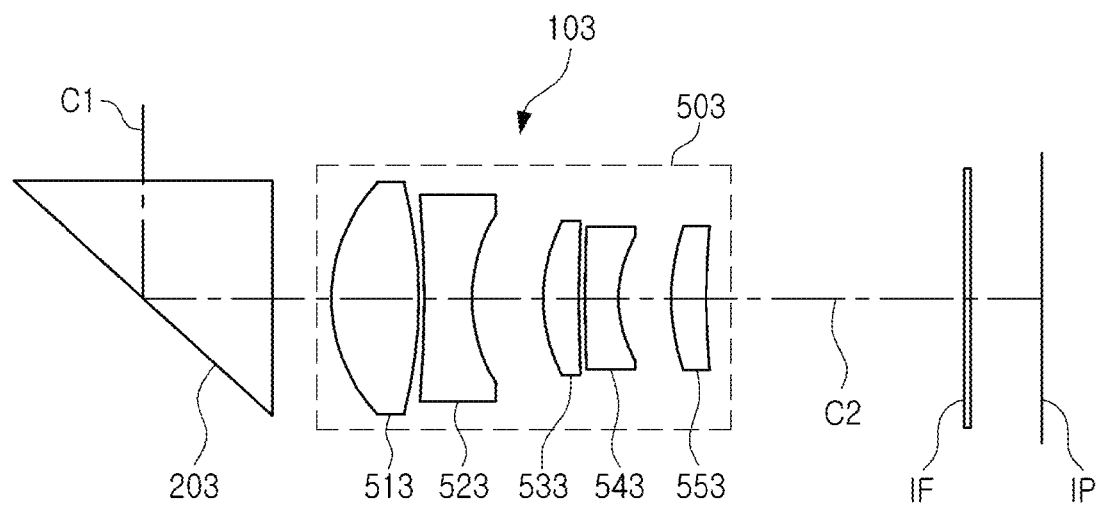
FIG. 11 is a configuration diagram of a camera module including a lens module according to another example.

A camera module according to a third example will be described with reference to FIG. 11.

A camera module 103 may include a first optical path folding unit 203, a lens module 503, a filter IF, and an image sensor IP.

The first optical path folding unit 203 may be configured to refract or reflect a path of incident light incident along a first optical axis C1 in the direction of a second optical axis C2. For example, the first optical path folding unit 203 may be a prism. As described above, an antireflection layer may be formed on the incident surface or the exit surface, or on the incident surface and the exit surface of the first optical path folding unit 203.

The filter IF is disposed in front of the image sensor IP, and may block infrared rays or the like included in the incident light. The image sensor IP may be comprised of a plurality of optical sensors. The image sensor IP may be configured to convert an optical signal into an electrical signal. The image sensor IP may form an image plane on which light incident through the lens module 503 is imaged.

The lens module 503 includes a first lens 513, a second lens 523, a third lens 533, a fourth lens 543, and a fifth lens 553.

The first lens 513 has positive refractive power. The fifth lens 523 has a convex object-side surface and a convex image-side surface. The second lens 523 has negative refractive power. The second lens 523 has a concave object-side surface and a concave image-side surface. The third lens 533 has positive refractive power. The third lens 533 has a convex object-side surface and a concave image-side surface. The fourth lens 543 has negative refractive power. The fourth lens 543 has a convex object-side surface and a concave image-side surface. The fifth lens 553 has positive refractive power. The fifth lens 553 has a convex object-side surface and a concave image-side surface.

Figure 12:
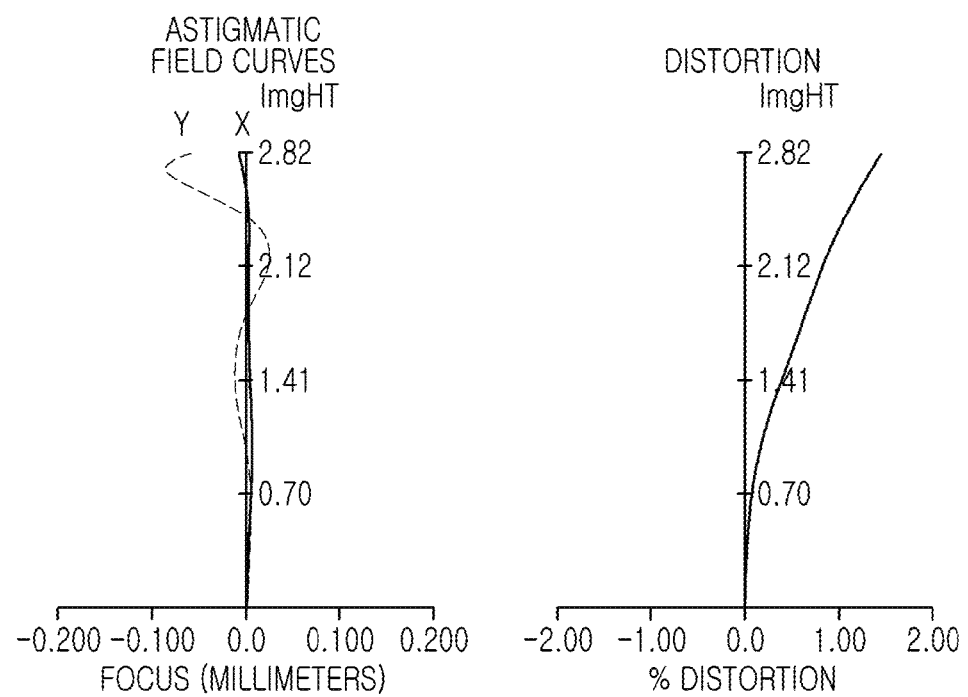
FIG. 12 is an aberration diagram of the lens module illustrated in FIG. 11.

Table 5 shows the lens characteristics of the lens module 503, and Table 6 shows the aspherical surface values of the lens module 503. FIG. 12 illustrates an aberration curve of the lens module 503 configured as above.

TABLE 5

| Surface Number | Remark | Curvature Radius | Thickness/ Distance | Refractive Index | Abbe Number | Effective Radius |
|---|---|---|---|---|---|---|
| S1 | Prism | Infinity | 0.000 | | | 2.477 |
| S2 | | Infinity | 2.265 | 1.723 | 29.5 | 2.265 |
| S3 | | Infinity | 2.265 | 1.723 | 29.5 | 3.204 |
| S4 | | Infinity | 1.000 | | | 2.265 |
| S5 | First Lens | 3.38 | 1.542 | 1.537 | 55.7 | 2.243 |
| S6 | | −9.23 | 0.100 | | | 2.116 |
| S7 | Second Lens | −26.28 | 0.819 | 1.621 | 26.0 | 1.998 |
| S8 | | 3.23 | 1.252 | | | 1.634 |

TABLE 5-continued

| Surface Number | Remark | Curvature Radius | Thickness/ Distance | Refractive Index | Abbe Number | Effective Radius |
|---|---|---|---|---|---|---|
| S9 | Third Lens | 3.78 | 0.628 | 1.679 | 19.2 | 1.494 |
| S10 | | 35.28 | 0.100 | | | 1.408 |
| S11 | Fourth Lens | 33.04 | 0.576 | 1.621 | 26.0 | 1.369 |
| S12 | | 2.54 | 0.919 | | | 1.173 |
| S13 | Fifth Lens | 4.19 | 0.612 | 1.547 | 56.1 | 1.327 |
| S14 | | 9.29 | 4.500 | | | 1.386 |
| S15 | Filter | Infinity | 0.110 | 1.519 | 64.2 | 2.490 |
| S16 | | Infinity | 1.245 | | | 2.508 |
| S17 | Image Plane | Infinity | 0.001 | | | 2.820 |

TABLE 6

| Surface Number | S5 | S6 | S7 | S8 | S9 | S10 | S11 | S12 | S13 | S14 |
|---|---|---|---|---|---|---|---|---|---|---|
| K | −0.59295 | −1.76428 | −36.00522 | 0.30070 | 0.42024 | 3.73586 | 88.93324 | 0.24307 | −1.07421 | −54.16544 |
| A | −0.00101 | −0.00190 | 0.00315 | 0.00603 | 0.00532 | 0.00759 | 0.00541 | 0.00998 | 0.01718 | 0.00735 |
| B | −0.00006 | 0.00002 | −0.00065 | −0.00041 | −0.00101 | −0.00172 | −0.00036 | −0.00295 | −0.00274 | −0.00034 |
| C | 0.00001 | 0.00000 | −0.00001 | 0.00005 | 0.00004 | −0.00010 | −0.00054 | −0.00119 | −0.00159 | 0.00035 |
| D | 0.00000 | 0.00000 | 0.00000 | −0.00002 | 0.00000 | −0.00011 | 0.00001 | −0.00018 | 0.00025 | −0.00062 |
| E | 0.00000 | 0.00000 | 0.00000 | 0.00001 | −0.00001 | −0.00002 | −0.00001 | 0.00026 | 0.00000 | 0.00002 |
| F | 0.00000 | 0.00000 | 0.00000 | 0.00000 | 0.00000 | 0.00000 | 0.00001 | 0.00001 | −0.00005 | 0.00005 |
| G | 0.00000 | 0.00000 | 0.00000 | 0.00000 | 0.00000 | 0.00000 | 0.00001 | 0.00001 | −0.00001 | −0.00002 |
| H | 0.00000 | 0.00000 | 0.00000 | 0.00000 | 0.00000 | 0.00000 | 0.00000 | 0.00000 | 0.00000 | −0.00001 |
| J | 0.00000 | 0.00000 | 0.00000 | 0.00000 | 0.00000 | 0.00000 | 0.00000 | 0.00000 | 0.00000 | 0.00001 |

Figure 13:
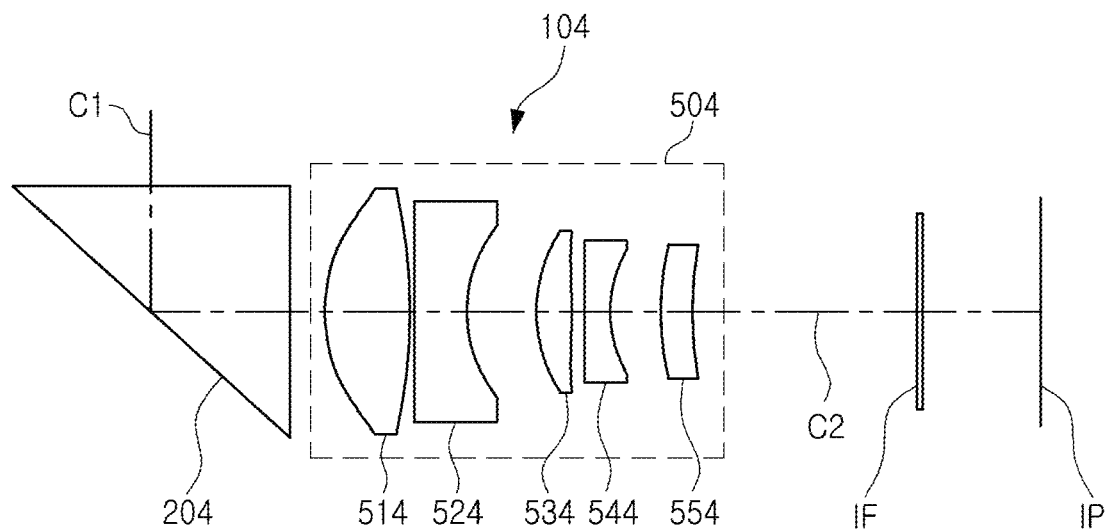
FIG. 13 is a configuration diagram of a camera module including a lens module according to another example.

A camera module according to a fourth example will be described with reference to FIG. 13.

A camera module 104 may include a first optical path folding unit 204, a lens module 504, a filter IF, and an image sensor IP.

The first optical path folding unit 204 may be configured to refract or reflect the path of incident light incident along a first optical axis C1 in the direction of a second optical axis C2. For example, the first optical path folding unit 204 may be a prism. As described above, an antireflection layer may be formed on the incident surface or the exit surface, or on the incident surface and the exit surface of the first optical path folding unit 204.

The filter IF is disposed in front of the image sensor IP, and may block infrared rays or the like included in the incident light. The image sensor IP may be comprised of a plurality of optical sensors. The image sensor IP may be configured to convert an optical signal into an electrical signal. The image sensor IP may form an image plane on which light incident through the lens module 504 is imaged.

The lens module 504 includes a first lens 514, a second lens 524, a third lens 534, a fourth lens 544, and a fifth lens 554.

The first lens 514 has positive refractive power. The fifth lens 524 has a convex object-side surface and a convex image-side surface. The second lens 524 has negative refractive power. The second lens 524 has a concave object-side surface and a concave image-side surface. The third lens 534 has positive refractive power. The third lens 534 has a convex object-side surface and a concave image-side surface. The fourth lens 544 has negative refractive power. The fourth lens 544 has a convex object-side surface and a concave image-side surface. The fifth lens 554 has positive refractive power. The fifth lens 554 has a convex object-side surface and a concave image-side surface.

Figure 14:
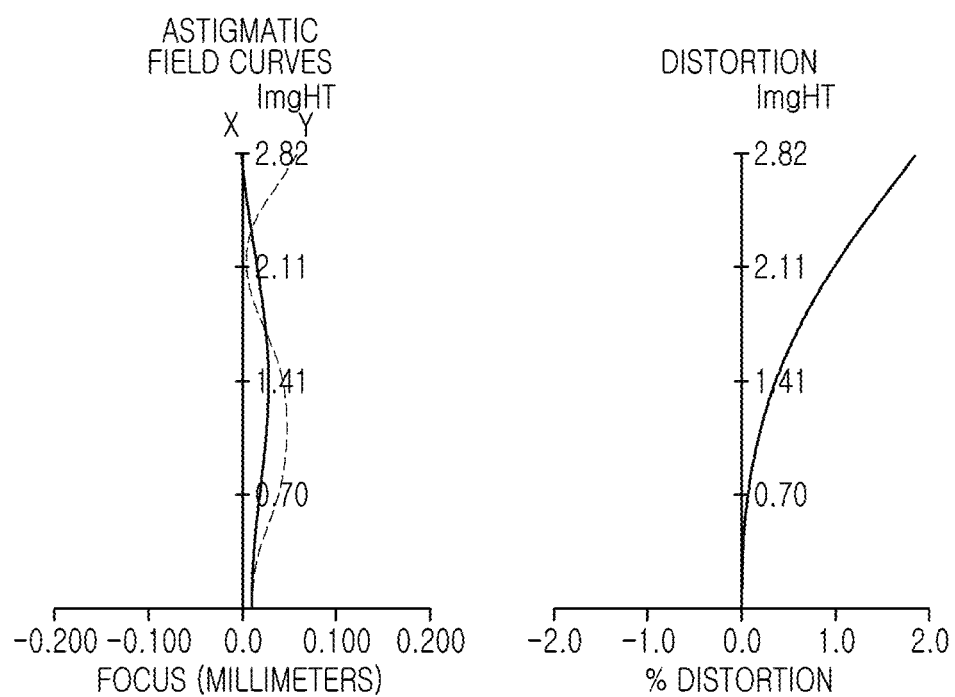
FIG. 14 is an aberration diagram of the lens module illustrated in FIG. 13.

Table 7 shows the lens characteristics of the lens module 504, and Table 8 illustrates the aspherical surface values of the lens module 504. FIG. 14 illustrates an aberration curve of the lens module 504 configured as above.

TABLE 7

| Surface Number | Remark | Curvature Radius | Thickness/ Distance | Refractive Index | Abbe Number | Effective Radius |
|---|---|---|---|---|---|---|
| S1 | Prism | Infinity | 0.000 | | | 3.230 |
| S2 | | Infinity | 3.090 | 1.723 | 29.5 | 3.090 |
| S3 | | Infinity | 3.090 | 1.723 | 29.5 | 4.370 |
| S4 | | Infinity | 0.750 | | | 3.090 |
| S5 | First Lens | 4.23 | 1.912 | 1.537 | 55.7 | 3.000 |
| S6 | | −14.35 | 0.100 | | | 2.893 |
| S7 | Second Lens | 461.50 | 1.165 | 1.641 | 24.0 | 2.709 |
| S8 | | 3.55 | 1.550 | | | 2.131 |
| S9 | Third Lens | 4.18 | 0.760 | 1.679 | 19.2 | 1.975 |
| S10 | | 110.23 | 0.295 | | | 1.885 |
| S11 | Fourth Lens | 42.92 | 0.566 | 1.641 | 24.0 | 1.743 |
| S12 | | 3.24 | 1.131 | | | 1.500 |
| S13 | Fifth Lens | 6.41 | 0.698 | 1.547 | 56.1 | 1.617 |
| S14 | | 8.89 | 5.000 | | | 1.641 |
| S15 | Filter | Infinity | 0.110 | 1.519 | 64.2 | 2.379 |
| S16 | | Infinity | 2.628 | | | 2.391 |
| S17 | Image Plane | Infinity | 0.009 | | | 2.824 |

TABLE 8

| Surface Number | S5 | S6 | S7 | S8 | S9 | S10 | S11 | S12 | S13 | S14 |
|---|---|---|---|---|---|---|---|---|---|---|
| K | −0.59421 | −1.28570 | 99.00000 | 0.28270 | 0.44801 | 99.00000 | 48.56246 | 0.30847 | −2.84158 | −44.71786 |
| A | −0.00055 | −0.00103 | 0.00169 | 0.00355 | 0.00283 | 0.00411 | 0.00307 | 0.00486 | 0.01056 | 0.00298 |
| B | −0.00002 | 0.00000 | −0.00024 | −0.00019 | −0.00035 | −0.00065 | −0.00016 | −0.00100 | −0.00114 | −0.00033 |
| C | 0.00000 | 0.00000 | 0.00000 | 0.00001 | 0.00001 | −0.00002 | −0.00015 | −0.00020 | −0.00058 | 0.00018 |
| D | 0.00000 | 0.00000 | 0.00000 | 0.00000 | 0.00000 | −0.00002 | 0.00000 | −0.00004 | 0.00006 | −0.00013 |
| E | 0.00000 | 0.00000 | 0.00000 | 0.00000 | 0.00000 | 0.00000 | 0.00000 | 0.00003 | 0.00000 | 0.00000 |
| F | 0.00000 | 0.00000 | 0.00000 | 0.00000 | 0.00000 | 0.00000 | 0.00000 | 0.00000 | 0.00000 | 0.00000 |
| G | 0.00000 | 0.00000 | 0.00000 | 0.00000 | 0.00000 | 0.00000 | 0.00000 | 0.00000 | 0.00000 | 0.00000 |
| H | 0.00000 | 0.00000 | 0.00000 | 0.00000 | 0.00000 | 0.00000 | 0.00000 | 0.00000 | 0.00000 | 0.00000 |
| J | 0.00000 | 0.00000 | 0.00000 | 0.00000 | 0.00000 | 0.00000 | 0.00000 | 0.00000 | 0.00000 | 0.00000 |

Figure 15:
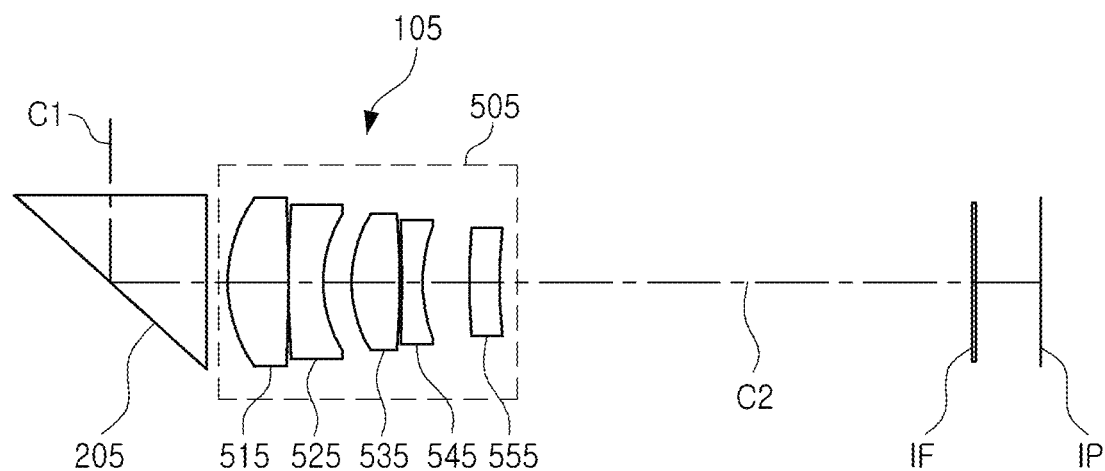
FIG. 15 is a configuration diagram of a camera module including a lens module according to another example.

A camera module according to a fifth example will be described with reference to FIG. 15.

A camera module 105 may include a first optical path folding unit 205, a lens module 505, a filter IF, and an image sensor IP.

The first optical path folding unit 205 may be configured to refract or reflect a path of incident light incident along a first optical axis C1 in the direction of a second optical axis C2. For example, the first optical path folding unit 205 may be a prism. As described above, an antireflection layer may be formed on the incident surface or the exit surface, or on the incident surface and the exit surface of the first optical path folding unit 205.

The filter IF is disposed in front of the image sensor IP, and may block infrared rays or the like included in the incident light. The image sensor IP may be comprised of a plurality of optical sensors. The image sensor IP may be configured to convert an optical signal into an electrical signal. The image sensor IP may form an image plane on which light incident through the lens module 505 is imaged.

The lens module 505 includes a first lens 515, a second lens 525, a third lens 535, a fourth lens 545, and a fifth lens 555.

The first lens 515 has positive refractive power. The fifth lens 525 has a convex object-side surface and a convex image-side surface. The second lens 525 has negative refractive power. The second lens 525 has a concave object-side surface and a concave image-side surface. The third lens 535 has positive refractive power. The third lens 535 has a convex object-side surface and a convex image-side surface. The fourth lens 545 has negative refractive power. The fourth lens 545 has a concave object-side surface and a concave image-side surface. The fifth lens 555 has positive refractive power. The fifth lens 555 has a convex object-side surface and a concave image-side surface.

Figure 16:
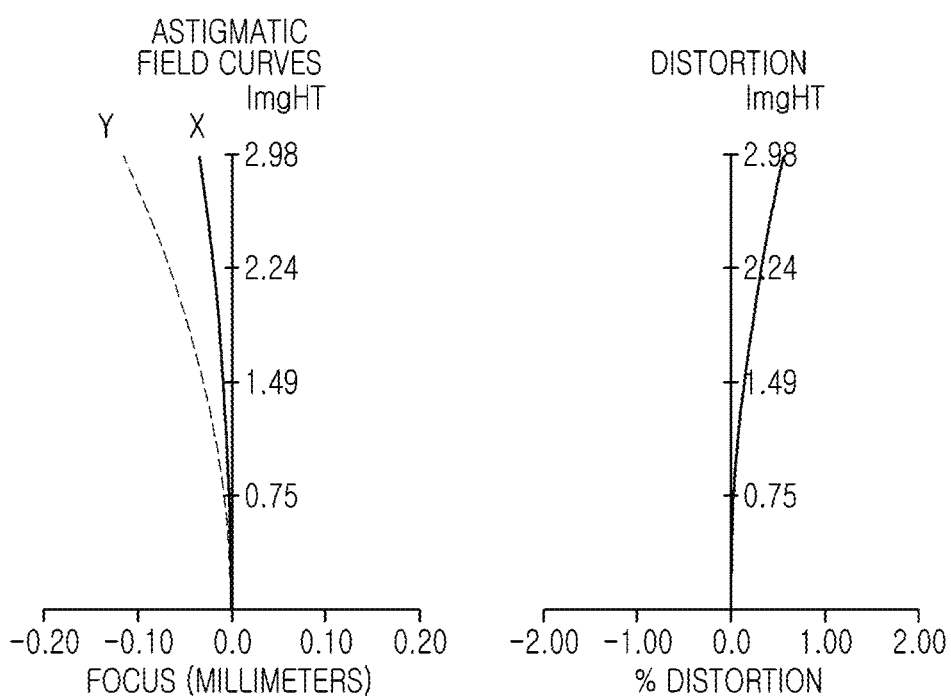
FIG. 16 is an aberration diagram of the lens module illustrated in FIG. 15.

Table 9 shows the lens characteristics of the lens module 505, and Table 10 shows the aspherical surface values of the lens module 505. FIG. 16 illustrates an aberration curve of the lens module 505 configured as above.

TABLE 9

| Surface Number | Remark | Curvature Radius | Thickness/ Distance | Refractive Index | Abbe Number | Effective Radius |
|---|---|---|---|---|---|---|
| S1 | Prism | Infinity | 0.000 | | | 3.176 |
| S2 | | Infinity | 3.120 | 1.723 | 29.5 | 3.120 |
| S3 | | Infinity | 3.120 | 1.723 | 29.5 | 4.412 |
| S4 | | Infinity | 0.750 | | | 3.120 |
| S5 | First Lens | 5.71 | 1.954 | 1.537 | 55.7 | 3.000 |
| S6 | | −69.37 | 0.034 | | | 2.785 |

TABLE 9-continued

| Surface Number | Remark | Curvature Radius | Thickness/ Distance | Refractive Index | Abbe Number | Effective Radius |
|---|---|---|---|---|---|---|
| S7 | Second Lens | 244.43 | 1.085 | 1.646 | 23.5 | 2.754 |
| S8 | | 4.88 | 0.930 | | | 2.412 |
| S9 | Third Lens | 5.26 | 1.568 | 1.668 | 20.4 | 2.423 |
| S10 | | −38.32 | 0.072 | | | 2.242 |
| S11 | Fourth Lens | −98.75 | 0.669 | 1.646 | 23.5 | 2.204 |
| S12 | | 5.63 | 1.531 | | | 1.990 |
| S13 | Fifth Lens | 15.51 | 0.980 | 1.546 | 56.0 | 1.935 |
| S14 | | 16.62 | 15.391 | | | 1.902 |
| S15 | Filter | Infinity | 0.110 | 1.519 | 64.2 | 2.823 |
| S16 | | Infinity | 2.147 | | | 2.828 |
| S17 | Image Plane | Infinity | −0.001 | | | 2.986 |

TABLE 10

| Surface Number | S5 | S6 | S7 | S8 | S9 | S10 | S11 | S12 | S13 | S14 |
|---|---|---|---|---|---|---|---|---|---|---|
| K | −0.44733 | −7.83886 | 99.00000 | 0.15108 | 0.37211 | −62.20732 | 0.00000 | 0.42974 | −7.39730 | −24.78544 |
| A | −0.00016 | −0.00011 | 0.00020 | 0.00057 | 0.00043 | −0.00001 | 0.00000 | 0.00064 | 0.00167 | 0.00047 |
| B | −0.00001 | 0.00000 | −0.00001 | 0.00000 | −0.00002 | −0.00008 | 0.00000 | −0.00002 | 0.00003 | 0.00007 |
| C | 0.00000 | 0.00000 | 0.00000 | 0.00000 | 0.00000 | 0.00000 | 0.00000 | 0.00000 | 0.00001 | 0.00002 |
| D | 0.00000 | 0.00000 | 0.00000 | 0.00000 | 0.00000 | 0.00000 | 0.00000 | 0.00000 | 0.00000 | 0.00000 |
| E | 0.00000 | 0.00000 | 0.00000 | 0.00000 | 0.00000 | 0.00000 | 0.00000 | 0.00000 | 0.00000 | 0.00000 |
| F | 0.00000 | 0.00000 | 0.00000 | 0.00000 | 0.00000 | 0.00000 | 0.00000 | 0.00000 | 0.00000 | 0.00000 |
| G | 0.00000 | 0.00000 | 0.00000 | 0.00000 | 0.00000 | 0.00000 | 0.00000 | 0.00000 | 0.00000 | 0.00000 |
| H | 0.00000 | 0.00000 | 0.00000 | 0.00000 | 0.00000 | 0.00000 | 0.00000 | 0.00000 | 0.00000 | 0.00000 |
| J | 0.00000 | 0.00000 | 0.00000 | 0.00000 | 0.00000 | 0.00000 | 0.00000 | 0.00000 | 0.00000 | 0.00000 |

Figure 17:
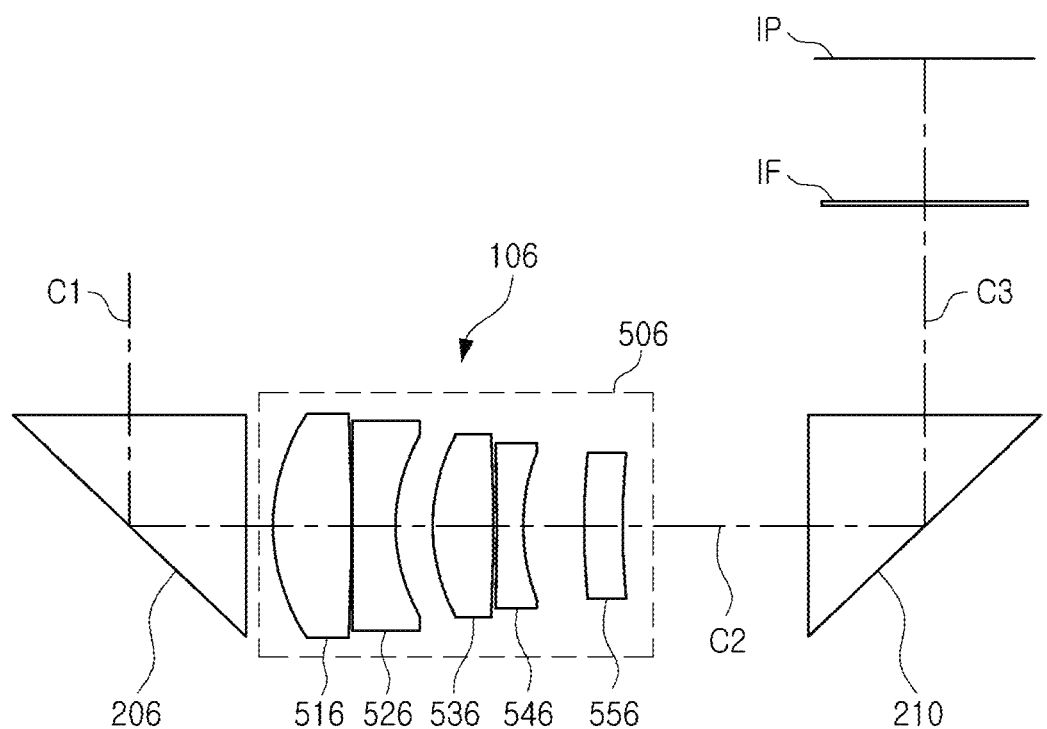
FIG. 17 is a configuration diagram of a camera module including a lens module according to another example.

A camera module according to a sixth example will be described with reference to FIG. 17.

A camera module 106 may include a first optical path folding unit 206, a second optical path folding unit 210, a lens module 506, a filter IF, and an image sensor IP.

The first optical path folding unit 206 may be configured to refract or reflect a path of incident light incident along a first optical axis C1 in the direction of a second optical axis C2. For example, the first optical path folding unit 206 may be a prism. An antireflection layer having the above-described shape may be formed on the incident surface or the exit surface or on the incident surface and the exit surface of the first optical path folding unit 206.

The second optical path folding unit 210 may be configured to refract or reflect a path of incident light incident along the second optical axis C2 in the direction of a third optical axis C3. For example, the second optical path folding unit 210 may be a prism. An antireflection layer having the above-described shape may be formed on the incident surface or the exit surface or on the incident surface and the exit surface of the second optical path folding unit 210.

The filter IF is disposed in front of the image sensor IP, and may block infrared rays or the like included in the incident light. The image sensor IP may be comprised of a plurality of optical sensors. The image sensor IP may be configured to convert an optical signal into an electrical signal. The image sensor IP may form an image plane on which light incident through the lens module 506 is imaged.

The lens module 506 includes a first lens 516, a second lens 526, a third lens 536, a fourth lens 546, and a fifth lens 556.

The first lens 516 has positive refractive power. The fifth lens 526 has a convex object-side surface and a convex image-side surface. The second lens 526 has negative refractive power. The second lens 526 has a concave object-side surface and a concave image-side surface. The third lens 536 has positive refractive power. The third lens 536 has a convex object-side surface and a convex image-side surface. The fourth lens 546 has negative refractive power. The fourth lens 546 has a concave object-side surface and a concave image-side surface. The fifth lens 556 has positive refractive power. The fifth lens 556 has a convex object-side surface and a concave image-side surface.

Figure 18:
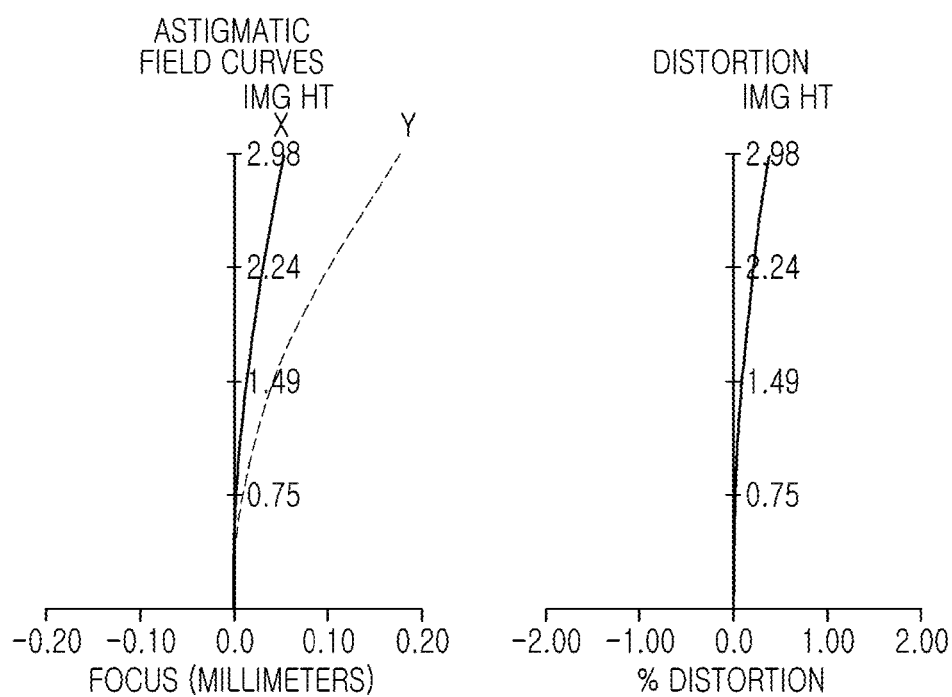
FIG. 18 is an aberration diagram of the lens module illustrated in FIG. 17.

Table 11 shows the lens characteristics of the lens module 506, and Table 12 shows the aspherical surface values of the lens module 506. FIG. 18 illustrates an aberration curve of the lens module 506 configured as above.

TABLE 11

| Surface Number | Remark | Curvature Radius | Thickness/ Distance | Refractive Index | Abbe Number | Effective Radius |
|---|---|---|---|---|---|---|
| S1 | First Prism | Infinity | 0.000 | | | 3.341 |
| S2 | | Infinity | 3.120 | 1.723 | 29.5 | 3.232 |
| S3 | | Infinity | 3.120 | 1.723 | 29.5 | 4.570 |
| S4 | | Infinity | 0.750 | | | 3.232 |
| S5 | First Lens | 6.090 | 2.084 | 1.537 | 55.7 | 3.200 |
| S6 | | −74.00 | 0.037 | | | 3.021 |
| S7 | Second Lens | 260.7 | 1.157 | 1.646 | 23.5 | 2.986 |
| S8 | | 5.200 | 0.992 | | | 2.600 |
| S9 | Third Lens | 5.610 | 1.673 | 1.668 | 20.4 | 2.599 |
| S10 | | −40.9 | 0.077 | | | 2.399 |
| S11 | Fourth Lens | −105.3 | 0.714 | 1.646 | 23.5 | 2.357 |
| S12 | | 6.010 | 1.633 | | | 2.122 |
| S13 | Fifth Lens | 16.54 | 1.046 | 1.546 | 56.0 | 2.091 |
| S14 | | 17.73 | 5.000 | | | 2.029 |
| S15 | Second Prism | Infinity | 3.120 | 1.519 | 64.2 | 3.232 |
| S16 | | Infinity | 3.120 | 1.723 | 29.5 | 4.570 |
| S17 | | Infinity | 0.000 | 1.723 | 29.5 | 3.232 |
| S18 | | Infinity | 6.000 | | | 2.415 |
| S19 | Filter | Infinity | 0.110 | 1.519 | 64.2 | 2.738 |
| S20 | | Infinity | 4.090 | | | 2.742 |
| S21 | Image Plane | Infinity | 0.001 | | | 2.988 |

TABLE 12

| Surface Number | 5 | 6 | 7 | 8 | 9 | 10 | 11 | 12 | 13 | 14 |
|---|---|---|---|---|---|---|---|---|---|---|
| K | −0.44733 | −7.83886 | 99.00000 | 0.15108 | 0.37211 | −62.20732 | 0.00000 | 0.42974 | −7.39730 | −24.78544 |
| A | −0.00013 | −0.00009 | 0.00017 | 0.00047 | 0.00035 | −0.00001 | 0.00000 | 0.00052 | 0.00138 | 0.00039 |
| B | 0.00000 | 0.00000 | −0.00001 | 0.00000 | −0.00001 | −0.00005 | 0.00000 | −0.00001 | 0.00002 | 0.00005 |
| C | 0.00000 | 0.00000 | 0.00000 | 0.00000 | 0.00000 | 0.00000 | 0.00000 | 0.00000 | 0.00001 | 0.00002 |
| D | 0.00000 | 0.00000 | 0.00000 | 0.00000 | 0.00000 | 0.00000 | 0.00000 | 0.00000 | 0.00000 | 0.00000 |
| E | 0.00000 | 0.00000 | 0.00000 | 0.00000 | 0.00000 | 0.00000 | 0.00000 | 0.00000 | 0.00000 | 0.00000 |
| F | 0.00000 | 0.00000 | 0.00000 | 0.00000 | 0.00000 | 0.00000 | 0.00000 | 0.00000 | 0.00000 | 0.00000 |

TABLE 12-continued

| Surface Number | 5 | 6 | 7 | 8 | 9 | 10 | 11 | 12 | 13 | 14 |
|---|---|---|---|---|---|---|---|---|---|---|
| G | 0.00000 | 0.00000 | 0.00000 | 0.00000 | 0.00000 | 0.00000 | 0.00000 | 0.00000 | 0.00000 | 0.00000 |
| H | 0.00000 | 0.00000 | 0.00000 | 0.00000 | 0.00000 | 0.00000 | 0.00000 | 0.00000 | 0.00000 | 0.00000 |
| J | 0.00000 | 0.00000 | 0.00000 | 0.00000 | 0.00000 | 0.00000 | 0.00000 | 0.00000 | 0.00000 | 0.00000 |

Figure 19:
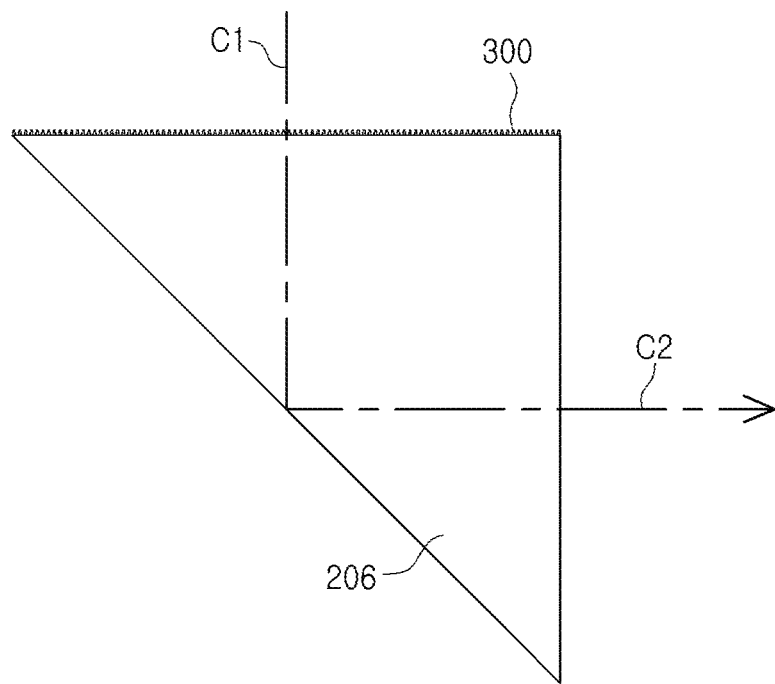
FIG. 19 is an enlarged view of a first optical path folding unit illustrated in FIG. 18.
Figure 20:
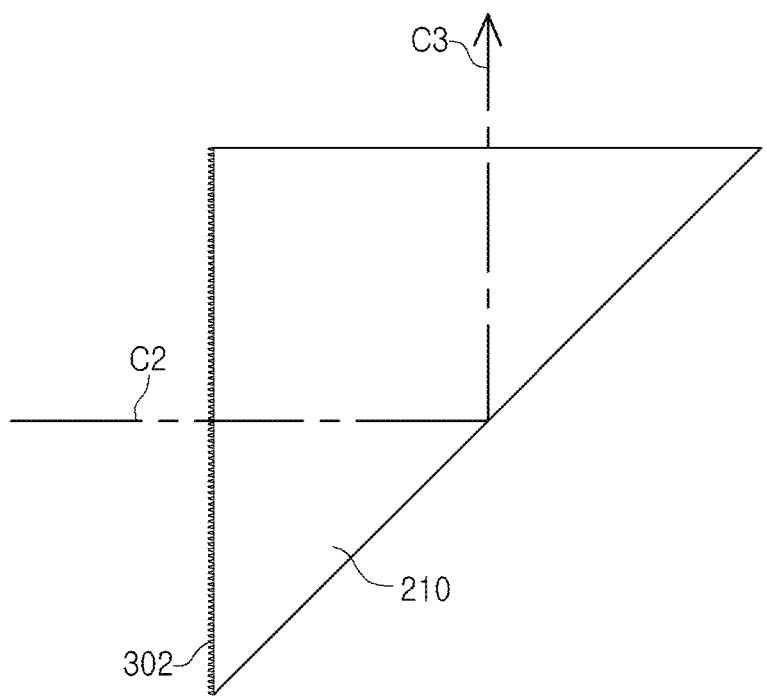
FIG. 20 is an enlarged view of a second optical path folding unit illustrated in FIG. 18.

In the camera module 106 according to the present example, antireflection layers 300 and 302 may be formed on the first optical path folding unit 206 and the second optical path folding unit 210. For example, as illustrated in FIG. 19, the first optical path folding unit 206 has the first antireflection layer 300 formed on the incident surface, and the second optical path folding unit 210 has the second antireflection layer 302 formed on the exit surface. The antireflection layers 300 and 302 may have a shape of a moth eye including a plurality of protrusions as described above.

The first antireflection layer 300 and the second antireflection layer 302 may have the same type of moth-eye structure. However, the first antireflection layer 300 and the second antireflection layer 302 do not necessarily have the same moth-eye structure. For example, the first antireflection layer 300 may have a moth-eye structure having a denser protrusion density than the second antireflection layer 302.

The camera module 106 configured as described above has the antireflection layers 300 and 302 formed on the optical path folding units 206 and 210, respectively, which are disposed on the object side and the image plane of the lens module 506, respectively, thereby significantly increasing the flare suppression effect by the antireflection layers 300 and 302.

Table 13 illustrates conditional expression values of the lens module according to the respective examples.

TABLE 13

| Conditional Expression | First Example | Second Example | Third Example | Fourth Example | Fifth Example | Sixth Example |
|---|---|---|---|---|---|---|
| f | 17.0000 | 25.0000 | 13.0000 | 18.0000 | 30.0000 | 32.0000 |
| PRh/LES1 | 1.0100 | 1.0101 | 1.0098 | 1.0300 | 1.0400 | 1.0100 |
| n2 + n3 | 3.3000 | 3.3000 | 3.3000 | 3.3200 | 3.3140 | 3.3140 |
| |f1 + f2| | 0.6293 | 0.6103 | 0.2251 | 0.7204 | 2.1934 | 2.3396 |
| DL1L2/f | 0.0034 | 0.0084 | 0.0077 | 0.0056 | 0.0011 | 0.0012 |
| EL1S1/ImgHT | 0.9542 | 0.8900 | 0.7954 | 1.0638 | 1.0067 | 1.0738 |
| EL1S2/EL1S1 | 0.9200 | 0.9542 | 0.9434 | 0.9643 | 0.9283 | 0.9441 |
| TTL/f | 0.9713 | 1.0070 | 0.9542 | 0.8847 | 0.8824 | 0.9642 |
| TTL/ImgHT | 6.3023 | 6.2935 | 4.3986 | 5.6468 | 8.8832 | 10.3537 |
| R1/f | 0.2671 | 0.2420 | 0.2600 | 0.2350 | 0.1903 | 0.1903 |
| f number | 3.4000 | 3.5100 | 2.9000 | 3.0000 | 5.0000 | 5.0000 |
| |f/f1 + f/f2| | 0.2946 | 0.1604 | 0.1324 | 0.3676 | 0.8597 | 0.8597 |
| f/(f number) | 5.0000 | 7.1225 | 4.4828 | 6.0000 | 6.0000 | 6.4000 |

Figure 21:
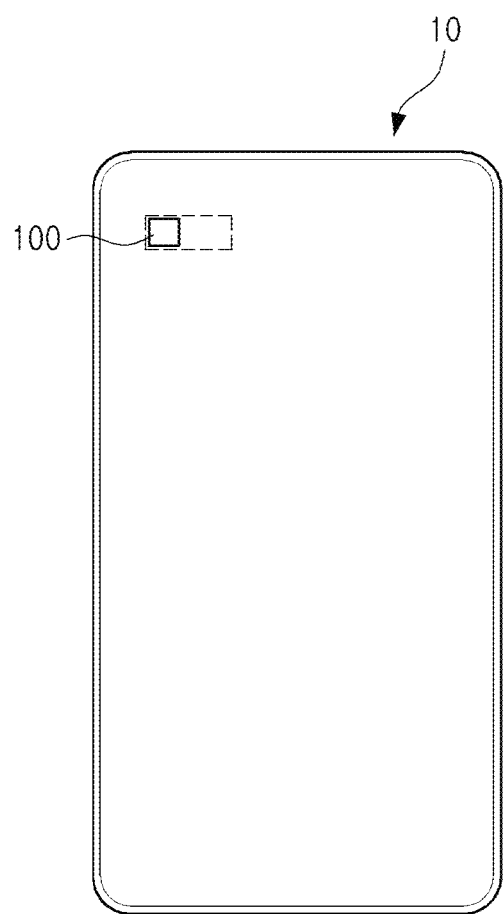
FIG. 21 is a rear view of a portable terminal according to an example.

A portable terminal according to an example will be described with reference to FIG. 21.

The portable terminal 10 according to the present example may be in the form of a wireless communication device. For example, the portable terminal 10 may be in the form of a wireless telephone such as a smart phone or the like. However, the portable terminal 10 according to the present example is not limited to a wireless phone. For example, the portable terminal 10 may be one of other types, such as a laptop or a notebook.

The portable terminal 10 may include a camera module 100. The camera module 100 may have a structure illustrated in FIGS. 1 to 6. Alternatively, the camera module 100 may be one of the types according to the first to sixth examples. For example, the camera module 100 may have a structure in which a flare phenomenon may be significantly reduced through an antireflection layer.

Accordingly, the portable terminal 10 according to the present example may capture a clear and high-resolution photo or video through the camera module 100 under any environmental conditions.

As set forth above, according to an example, the reflection of light occurring from a filter member or a light transmitting member such as a prism or the like may be reduced or suppressed.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
   a lens module; and
   a first optical path folding unit disposed on an object side of the lens module and configured to refract or reflect incident light in an optical axis direction of the lens module,
   wherein 1.0<PRh/LES1<1.10, where PRh is a maximum effective radius of an exit surface of the first optical path folding unit and LES1 is a maximum effective radius of a lens closest to the object side in the lens module,
wherein 10 mm≤f, where f is a focal length of the lens module,
wherein the first optical path folding unit comprises a first antireflection layer including a first protrusion, and a second antireflection layer including a second protrusion, and
wherein the first protrusion and the second protrusion have different sizes.

2. The camera module of claim 1, wherein the first antireflection layer is disposed on an incident surface of the first optical path folding unit and the second antireflection layer is disposed on the exit surface of the first optical path folding unit.

3. The camera module of claim 1, wherein the first antireflection layer and the second antireflection layer each comprise a plurality of protrusions.

4. The camera module of claim 1,
wherein the first antireflection layer is disposed on an incident surface of the first optical path folding unit, and includes the first protrusion; and
wherein the second antireflection forming layer is disposed on the exit surface of the first optical path folding unit, and includes the second protrusion.

5. The camera module of claim 4, wherein a formation gap of the first protrusion is different from a formation gap of the second protrusion.

6. The camera module of claim 1, wherein at least one or more of lenses constituting the lens module are configured to have different sizes in a first direction and a second direction intersecting an optical axis.

7. The camera module of claim 1, wherein the lens module comprises a first lens, a second lens, a third lens, a fourth lens, and a fifth lens sequentially disposed from the object side of the lens module.

8. The camera module of claim 7, wherein the first lens, the third lens and the fifth lens have a positive refractive power, and
wherein the second lens and the fourth lens have a negative refractive power.

9. The camera module of claim 7, wherein at least four of the first lens, the second lens, the third lens, the fourth lens, and the fifth lens have a convex object-side surface.

10. The camera module of claim 7, wherein at least three of the first lens, the second lens, the third lens, the fourth lens, and fifth lens have a concave image-side surface.

11. The camera module of claim 1, further comprising a second optical path folding unit disposed between the lens module and an image plane.

12. The camera module of claim 11, wherein a third antireflection layer includes a protrusion and is disposed on one or both of an incident surface of the second optical path folding unit and an exit surface of the second optical path folding unit.

13. A portable terminal comprising the camera module according to claim 1.

14. A camera module, comprising:
a lens module;
a first optical path folding unit disposed on an object side of the lens module and configured to refract or reflect incident light in an optical axis direction of the lens module; and
a second optical path folding unit disposed between the lens module and an image plane,
wherein $1.0 < PRh/LES1 < 1.10$, where PRh is a maximum effective radius of an exit surface of the first optical path folding unit and LES1 is a maximum effective radius of a lens closest to the object side in the lens module,
wherein 10 mm≤f, where f is a focal length of the lens module.

15. The camera module of claim 14, wherein the first optical path folding unit comprises an antireflection layer disposed thereon.

16. The camera module of claim 15, wherein the antireflection layer is disposed on one or both of an incident surface of the first optical path folding unit and the exit surface of the first optical path folding unit.

17. The camera module of claim 15, wherein the antireflection layer comprises a plurality of protrusions.

* * * * *